United States Patent
Nakanishi et al.

(10) Patent No.: US 11,847,287 B2
(45) Date of Patent: Dec. 19, 2023

(54) TOUCH PANEL, DISPLAY PANEL, AND DISPLAY UNIT

(71) Applicant: Japan Display Inc., Tokyo (JP)

(72) Inventors: Takayuki Nakanishi, Aichi (JP); Koji Noguchi, Kanagawa (JP); Koji Ishizaki, Aichi (JP); Yasuyuki Teranishi, Aichi (JP); Takeya Takeuchi, Aichi (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/173,879

(22) Filed: Feb. 24, 2023

(65) Prior Publication Data

US 2023/0205382 A1    Jun. 29, 2023

Related U.S. Application Data

(63) Continuation of application No. 17/339,203, filed on Jun. 4, 2021, now Pat. No. 11,630,544, which is a
(Continued)

(30) Foreign Application Priority Data

Jun. 5, 2009   (JP) .................. 2009-136507

(51) Int. Cl.
*G06F 3/047* (2006.01)
*G06F 3/044* (2006.01)
(Continued)

(52) U.S. Cl.
CPC ........ *G06F 3/0446* (2019.05); *G06F 3/03547* (2013.01); *G06F 3/047* (2013.01);
(Continued)

(58) Field of Classification Search
CPC .. G06F 3/0446; G06F 3/03547; G06F 3/0412; G06F 3/0418; G06F 3/0445; G06F 3/047; G06F 3/0448; G09G 3/2983; G09G 3/2986; G09G 3/3696; G09G 2330/06; H01J 11/12; G02F 1/134363; G02F 1/134372
See application file for complete search history.

(56) References Cited

U.S. PATENT DOCUMENTS 6,477,686 B1   11/2002   Dewey et al.
7,932,898 B2    4/2011   Philipp et al.
(Continued)

FOREIGN PATENT DOCUMENTS

JP    2008-009750    1/2008

*Primary Examiner* — Douglas M Wilson
(74) *Attorney, Agent, or Firm* — DENTONS US LLP

(57) ABSTRACT

A touch panel, a display panel, and a display unit achieving prevention of erroneous detection caused by external noise. The touch panel includes: a plurality of detection scan electrodes extending in a first direction and a plurality of detection electrodes facing the plurality of detection scan electrodes and extending in a second direction which intersects the first direction. The one or more selected detection scan electrodes are selected, in a desired unit, from the plurality of detection scan electrodes, to be supplied with a selection pulse, and each of the first and the second detection electrodes is selected from the plurality of detection electrodes.

20 Claims, 22 Drawing Sheets

Related U.S. Application Data continuation of application No. 16/166,810, filed on Oct. 22, 2018, now Pat. No. 11,029,794, which is a continuation of application No. 14/699,029, filed on Apr. 29, 2015, now Pat. No. 10,147,382, which is a continuation of application No. 12/788,508, filed on May 27, 2010, now Pat. No. 9,122,357.

(51) Int. Cl.

| | | |
|---|---|---|
| *G09G 3/298* | (2013.01) | |
| *G06F 3/0354* | (2013.01) | |
| *H01J 11/12* | (2012.01) | |
| *G06F 3/041* | (2006.01) | |
| *G09G 3/36* | (2006.01) | |
| *G02F 1/1343* | (2006.01) | |

(52) U.S. Cl.
CPC .......... *G06F 3/0412* (2013.01); *G06F 3/0418* (2013.01); *G06F 3/0445* (2019.05); *G09G 3/2983* (2013.01); *G09G 3/2986* (2013.01); *G09G 3/3696* (2013.01); *H01J 11/12* (2013.01); *G02F 1/134363* (2013.01); *G02F 1/134372* (2021.01); *G06F 3/0448* (2019.05); *G09G 2330/06* (2013.01)

(56) References Cited

U.S. PATENT DOCUMENTS

| | | | |
|---|---|---|---|
| 2005/0073505 A1 | 4/2005 | Katsuki et al. | |
| 2007/0062739 A1* | 3/2007 | Philipp | G06F 3/0443 178/18.06 |
| 2007/0132724 A1 | 6/2007 | Tetsuo | |
| 2007/0242053 A1 | 10/2007 | Tetsuo | |
| 2008/0062148 A1 | 3/2008 | Hotelling et al. | |
| 2009/0213090 A1 | 8/2009 | Mamba et al. | |
| 2009/0296036 A1 | 12/2009 | Ikebe | |
| 2010/0045632 A1 | 2/2010 | Yilmaz et al. | |
| 2010/0078230 A1 | 4/2010 | Rosenblatt et al. | |
| 2010/0149116 A1 | 6/2010 | Yang et al. | |
| 2010/0164901 A1* | 7/2010 | Chen | G06F 3/0448 345/174 |
| 2010/0302201 A1* | 12/2010 | Ritter | G06F 3/0446 345/174 |

* cited by examiner

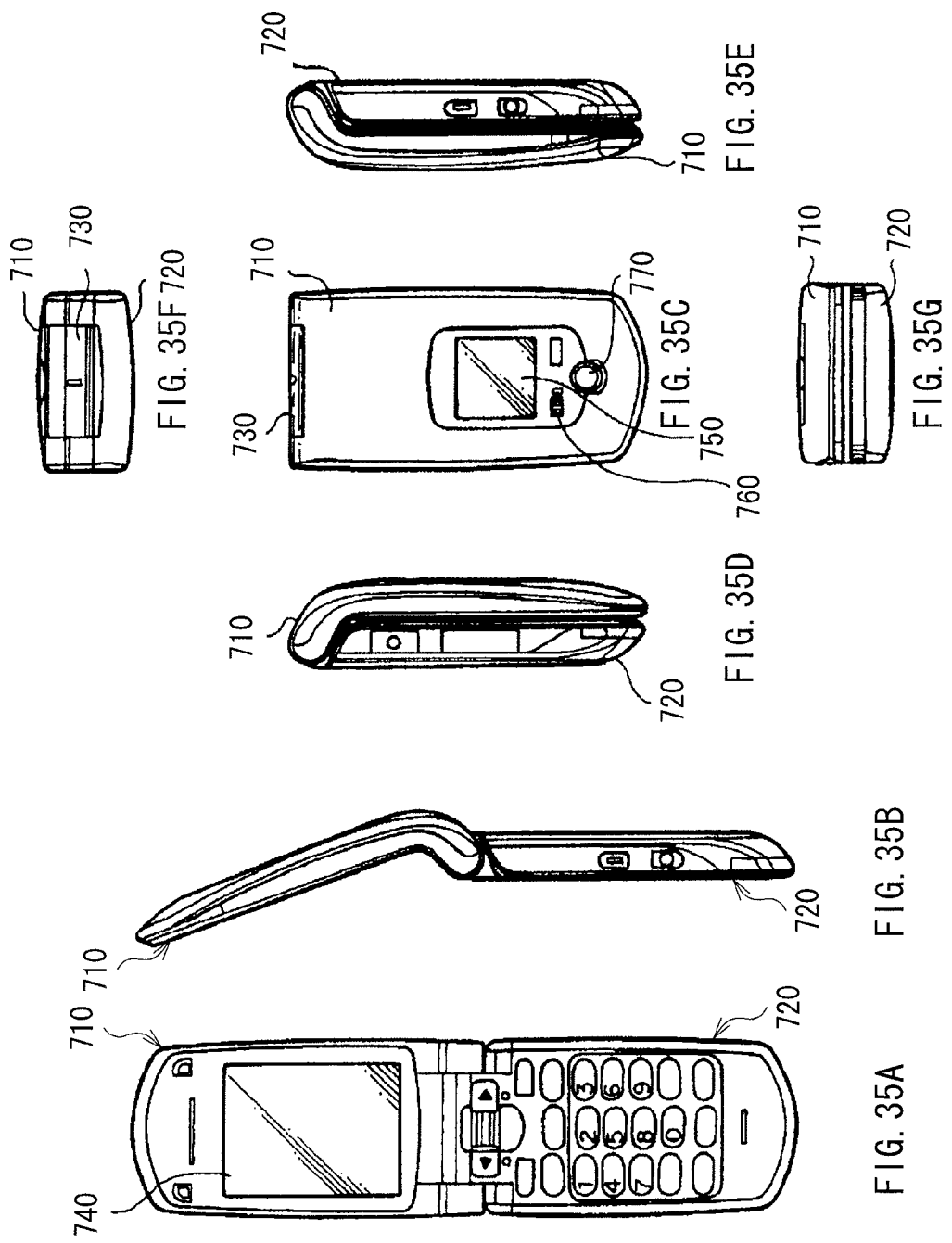

TOUCH PANEL, DISPLAY PANEL, AND DISPLAY UNIT

RELATED APPLICATION DATA

This application is a continuation of U.S. patent application Ser. No. 17/339,203 filed Jun. 4, 2021, which is a continuation of U.S. patent application Ser. No. 16/166,810 filed Oct. 22, 2018, now U.S. Pat. No. 11,029,794 issued Jun. 8, 2021, which is a continuation of U.S. patent application Ser. No. 14/699,029 filed Apr. 29, 2015, now U.S. Pat. No. 10,147,382 issued Dec. 4, 2018, which is a continuation of U.S. patent application Ser. No. 12/788,508 filed May 27, 2010, now U.S. Pat. No. 9,122,357 issued Sep. 1, 2015, the entireties of which are incorporated herein by reference to the extent permitted by law. The present application claims the benefit of priority to Japanese Patent Application No. JP 2009-136507 filed on Jun. 5, 2009 in the Japan Patent Office, the entirety of which is incorporated by reference herein to the extent permitted by law.

BACKGROUND OF THE INVENTION

Field of the Invention

The present invention relates to a touch panel, a display panel, and a display unit enabling information to be entered by being touched with an object such as a finger or pen.

Description of the Related Art

Techniques of entering information by touch with a finger or the like are known. Among them, a technique attracting particular attention is a display device capable of entering information by touching various buttons displayed on a display with a finger or the like in a manner similar to the case of touching normal buttons with a finger or the like. The technique allows the display and the buttons to be commonly used and therefore brings large advantages of smaller space and reduction in the number of parts.

Various types of touch sensors that detect a touch of a finger or the like exist. A popularized touch sensor is, for example, of an electrostatic capacitance type. A touch sensor of this type catches, by a capacitive element, a change occurring in the surface electric field of a panel when a touch panel is touched with a finger or the like, and detects a touch of a finger or the like (for reference, see Japanese Unexamined Patent Application Publication No. 2008-9750).

SUMMARY OF THE INVENTION

In the detecting method described above, a change in the surface electric field of the panel is read by a capacitive element. Consequently, in the case where noise from the outside enters the capacitive element, the surface electric field of the panel changes due to the noise, and there is a possibility that touch of a finger is erroneously detected. In particular, in the case where the user of a display device plays the role of an antenna and catches external noise, there is a problem such that when the user touches the panel with a finger or the like, the external noise is transmitted via the finger or the like to the panel, the surface electric field of the panel changes, and it causes erroneous detection.

It is therefore desirable to provide a touch panel, a display panel, and a display unit capable of eliminating erroneous detection caused by external noise.

A touch panel according to an embodiment of the invention includes a plurality of detection scan electrodes extending in a first direction; and a plurality of detection electrodes provided to face the plurality of detection scan electrodes and extending in a second direction which intersects the first direction, the plurality of detection electrodes having a first detection electrode and a second detection electrode. A ratio of fringe capacitance to total capacitance between one or more selected detection scan electrodes and the first detection electrode is different from a ratio of fringe capacitance to total capacitance between the one or more selected detection scan electrodes and the second detection electrode, the one or more selected detection scan electrodes being selected, in a desired unit, from the plurality of detection scan electrodes, to be supplied with a selection pulse, and each of the first detection electrode and the second detection electrode being selected from the plurality of detection electrodes.

As used herein, the term "fringe capacitance" corresponds to, for example, a capacitance generated by an electric field (round electric field) around a gap between two parallel plates when a voltage is applied between the two parallel plate electrodes facing each other. As used herein, the term "total capacitance" in "total capacitance between the one or more selected detection scan electrodes and the second detection electrode" corresponds to, for example, a capacitance obtained by totaling a capacitance (parallel plate capacitance) formed by the electric field in the gap between two parallel plates and the capacitance (fringe capacitance) formed by the round electric field when the voltage is applied between the two parallel plate electrodes facing each other.

A display panel according to an embodiment of the invention includes: a plurality of pixel electrodes; a common electrode provided to face the plurality of pixel electrodes; a display function layer having a display function; a plurality of detection scan electrodes extending in a first direction; and a plurality of detection electrodes provided to face the plurality of detection scan electrodes and extending in a second direction which intersects the first direction, the plurality of detection electrodes having a first detection electrode and a second detection electrode. A ratio of fringe capacitance to total capacitance between one or more selected detection scan electrodes and the first detection electrode is different from a ratio of fringe capacitance to total capacitance between the one or more selected detection scan electrodes and the second detection electrode, the one or more selected detection scan electrodes being selected, in a desired unit, from the plurality of detection scan electrodes, to be supplied with a selection pulse, and each of the first detection electrode and the second detection electrode being selected from the plurality of detection electrodes.

Another display panel according to an embodiment of the invention includes: a plurality of pixel electrodes; a plurality of common electrodes provided to face the plurality of pixel electrodes and extending in a first direction; a display function layer having a display function; and a plurality of detection electrodes provided to face the plurality of the common electrodes and extending in a second direction which intersects the first direction, the plurality of detection electrodes having a first detection electrode and a second detection electrode. A ratio of fringe capacitance to total capacitance between one or more selected common electrodes and the first detection electrode is different from a ratio of fringe capacitance to total capacitance between the one or more selected common electrodes and the second detection electrode, the one or more selected common electrodes being selected, in a desired unit, from the plurality of common electrodes, to be supplied with a selection pulse, and each of the first detection electrode and the second detection electrode being selected from the plurality of detection electrodes.

A display unit according to an embodiment of the invention includes: a plurality of pixel electrodes; a common electrode provided to face the plurality of pixel electrodes; a display function layer having a display function; a plurality of detection scan electrodes extending in a first direction; a plurality of detection electrodes provided to face the plurality of detection scan electrodes and extending in a second direction which intersects the first direction, the plurality of detection electrodes having a first detection electrode and a second detection electrode; a first drive section allowing the display function of the display function layer to be performed by applying a signal voltage corresponding to a video signal between each of the pixel electrode and the common electrode; a second drive section applying a selection pulse to the plurality of detection scan electrodes; and a detection section detecting an external proximity object on the basis of a detection signals obtained from the plurality of detection electrodes. A ratio of fringe capacitance to total capacitance between one or more selected detection scan electrodes and the first detection electrode is different from a ratio of fringe capacitance to total capacitance between the one or more selected detection scan electrodes and the second detection electrode, the one or more selected detection scan electrodes being selected, in a desired unit, from the plurality of detection scan electrodes by the second drive section, to be supplied with a selection pulse, and each of the first detection electrode and the second detection electrode being selected from the plurality of detection electrodes.

Another display unit according to an embodiment of the invention includes: a plurality of pixel electrodes; a plurality of common electrodes provided to face the plurality of pixel electrodes and extending in a first direction; a display function layer having a display function; a plurality of detection electrodes provided to face the plurality of the common electrodes and extending in a second direction which intersects the first direction, the plurality of detection electrodes having a first detection electrode and a second detection electrode; a drive section allowing the display function of the display function layer to be performed by applying a signal voltage corresponding to a video signal between each of the pixel electrode and the common electrode, and applying a selection pulse to the plurality of common electrodes; and a detection section detecting an external proximity object on the basis of a detection signals obtained from the plurality of detection electrodes. A ratio of fringe capacitance to total capacitance between one or more selected common electrodes and the first detection electrode is different from a ratio of fringe capacitance to total capacitance between the one or more selected common electrodes and the second detection electrode, the one or more selected common electrodes being selected, in a desired unit, from the plurality of common electrodes by the second drive section, to be supplied with a selection pulse, and each of the first detection electrode and the second detection electrode being selected from the plurality of detection electrodes.

In the touch panel, the display panels, and the display units according to the embodiments of the present invention, the ratio of the fringe capacitance to the total capacitance between the one or more selected detection scan electrodes (or common electrodes) and the first detection electrode is different from the ratio of the fringe capacitance to the total capacitance between the one or more selected detection scan electrodes (or common electrodes) and the second detection electrode. The ratio of the fringe capacitance to the capacitance between the one or more selected detection scan electrodes (or common electrodes) and one detection electrode corresponds to a sensitivity to the contact/noncontact state in that detection electrode. When the ratio is high, the sensitivity to the contact/noncontact state is high. When the ratio is low, the sensitivity to the contact/noncontact state is low. That is, in the embodiments of the present invention, at least two kinds of detection electrodes whose sensitivities to the contact/noncontact state are different are provided. Thus, when the one or more selected detection scan electrodes (or common electrodes) is/are selected in the desired unit, a signal level of the higher ratio of the fringe capacitance of either the detection signal obtained from the first detection electrode or the detection signal obtained from the second detection electrode is influenced by the external proximity object touching the touch panel and fluctuates largely more than a signal level of the lower ratio of the fringe capacitance. Hence, for example, by obtaining the difference between the detection signal obtained from the first detection electrode and the detection signal obtained from the second detection electrode, external noise is eliminated from the detection signal.

Preferably, a first capacitance between the external proximity object touching the touch panel and the first detection electrode, and a second capacitance between the external proximity object touching the touch panel and the second detection electrode, are almost equal to each other. In this case, the sensitivity to the external noise in the first detection electrode and that in the second detection electrode are almost equal to each other. Thus, for example, by simply obtaining the difference between the detection signal obtained from the first detection electrode and the detection signal obtained from the second detection electrode, the external noise is eliminated from the detection signals. Incidentally, the first capacitance and the second capacitance may be largely different from each other. In this case, for example, by correcting the signal level of the detection signal in consideration of an amount of discrepancy therebetween and deriving the difference by using the corrected detection signal, the external noise is eliminated from the detection signal.

In the touch panel, the display panels, and the display units according to the embodiments of the present invention, the ratio of the fringe capacitance to the total capacitance between the one or more selected detection scan electrodes (or common electrodes) and the first detection electrode is made different from the ratio of the fringe capacitance to the total capacitance between the one or more selected scan electrodes and the second detection electrode, making it possible to eliminate the external noise from the detection signal. Therefore, it is possible to eliminate erroneous detection caused by the external noise.

Other and further objects, features and advantages of the invention will appear more fully from the following description.

BRIEF DESCRIPTION OF THE DRAWINGS

FIG. 5 is a diagram illustrating an example of a schematic configuration of pixels in a liquid crystal display panel shown in

FIG. 4.

FIG. 31 is perspective view illustrating an appearance in application example 1 of the display device in the foregoing embodiments and the like.

FIG. 35A is a front view of an open state of application example 5, FIG. 35B is a side view, FIG. 35C is a front view of a closed state, FIG. 35D is a left side view, FIG. 35E is a right side view, FIG. 35F is a top view, and FIG. 35G is a bottom view.

DETAILED DESCRIPTION OF THE PREFERRED EMBODIMENTS

Preferred embodiments of the present invention will be described in detail below with reference to the drawings. Description will be given in the following order.

1. Basic Principle of Touch Detection Method

2. First Embodiment

An example that touch sensor is provided in touch panel.
An example that two kinds of detection electrodes having different shapes are provided.
An example that sensitivity of detection electrode is constant regardless of scan electrode.

3. Modification of First Embodiment

An example that output adjustment circuit is provided.

4. Second Embodiment

An example that touch sensor is provided in touch panel.
An example that two kinds of detection electrodes having different shapes are provided.
An example that sensitivity of detection electrode varies according to scan electrode.

5. Modification of Second Embodiment

An example that output adjustment circuit is provided.

6. Third Embodiment

An example that touch sensor is provided in touch panel.

An example that detection electrodes having the same shape are provided.
An example that fringe capacitance increases in predetermined detection electrode.

7. Fourth Embodiment

An example that touch sensor is provided in touch panel.
An example that detection electrodes having the same shape are provided.
An example that fringe capacitance is equal in all of detection electrodes.

8. Fifth Embodiment

An example that touch sensor is provided in liquid crystal display panel.
An example that two kinds of detection electrodes having different shapes are provided.
An example that sensitivity of detection electrode is constant regardless of scan electrode.

9. Modification of Fifth Embodiment

An example that output adjustment circuit is provided.

10. Sixth Embodiment

An example that touch sensor is provided in liquid crystal display panel.
An example that two kinds of detection electrodes having different shapes are provided.
An example that sensitivity of detection electrode varies according to scan electrode.

11. Modification of Sixth Embodiment

An example that output adjustment circuit is provided.

12. Application Examples

Examples that the liquid crystal display devices of the embodiments are applied to electronic devices.

[Basic Principle of Touch Detection Method]

Figure 1A:
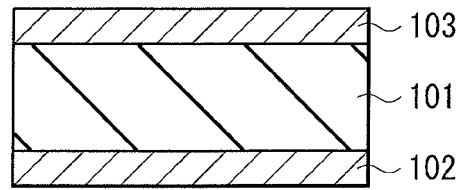
FIGS. 1A and 1B are diagrams for explaining the principle of operation of a touch detection method used in a liquid crystal display device according to an embodiment of the present invention, and illustrating a non-contact state.
Figure 1B:
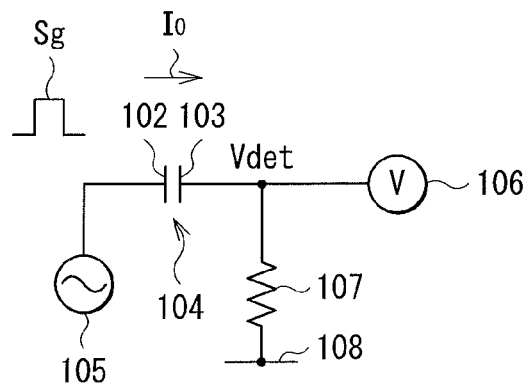

First, the basic principle of a touch detection method used in a display device of an embodiment will be described below. This touch detection method is embodied as a touch sensor of an electrostatic capacitance type. FIG. 1A schematically illustrates the touch sensor. FIG. 1B schematically illustrates an equivalent circuit of the touch sensor illustrated in FIG. 1A and a peripheral circuit connected to the touch sensor. The touch sensor has a dielectric 101 and a pair of electrodes 102 and 103 disposed opposing to each other while sandwiching the dielectric 101, and expressed as a capacitive element 104 in the equivalent circuit as shown in FIG. 1B.

One end (electrode 102) of the capacitive element 104 is connected to an AC signal source 105. The other end (electrode 103) of the capacitive element 104 is connected to a voltage detection circuit 106 and, further, is connected to a reference potential line 108 via a resistor 107. The AC signal source 105 outputs an AC rectangular wave Sg of predetermined frequency (for example, a few kHz to tens kHz). The voltage detection circuit 106 detects a crest value of an input signal and, further, determines whether the touch sensor is touched with a finger or not on the basis of the detection voltage thereof. The reference potential line 108 is, for example, electrically connected to a member (for example, a ground layer of a printed board or a conductive casing) to which a potential as a reference of a circuit operation is applied in a device on which the touch sensor is mounted. When the reference potential line 108 is connected to the member, the potential in the reference potential line 108 is equal to that of the member (the reference potential). The reference potential is, for example, the ground potential.

Figure 3:
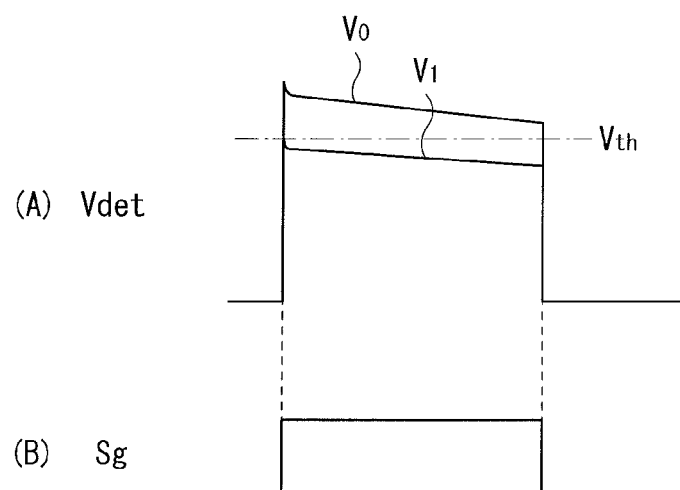
FIG. 3 is a diagram for explaining the principle of operation of the touch detection method used in the liquid crystal display device according to the embodiment of the present invention, and illustrating an example of waveform of a drive signal and a detection signal of a touch sensor.

In the touch sensor, when the AC rectangular wave Sg (Part (B) of FIG. 3) is applied from the AC signal source 105 to the electrode 102, an output waveform (detection signal Vdet) as shown in Part (A) of FIG. 3 appears.

In a state where the touch sensor is not touched with an object such as a finger (FIG. 1A), as shown in FIG. 1B, current Io according to the capacitance value of the capacitive element 104 flows in accordance with charging/discharging of the capacitive element 104. The potential waveform at this time on the side of the electrode 103 of the capacitive element 104 becomes like a waveform Vo of Part (A) of FIG. 3, and is detected by the voltage detection circuit 106.

Figure 2A:
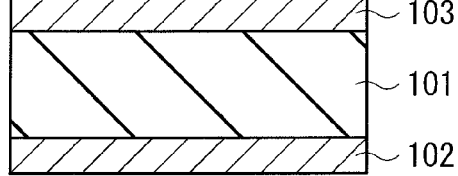
FIGS. 2A and 2B are diagrams for explaining the principle of operation of the touch detection method used in the liquid crystal display device according to the embodiment of the present invention, and illustrating a finger contact state.
Figure 2B:
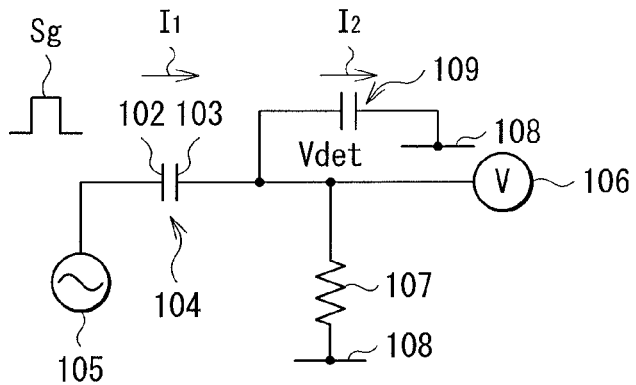

On the other hand, in a state where the touch sensor is touched with an object such as a finger (FIG. 2A), as shown in FIG. 2B, a capacitive element 109 formed by the object such as the finger is added to the capacitive element 104 in series. In this state, currents $I_1$ and $I_2$ flow according to charging/discharging of the capacitive elements 104 and 109, respectively. At this time, the potential waveform in the electrode 103 becomes, for example, a waveform $V_1$ of Part (A) of FIG. 3, and is detected by the voltage detection circuit 106. The potential of the electrode 103 becomes a divided potential determined by the values of the currents $I_1$ and $I_2$ flowing in the capacitive elements 104 and 109. Consequently, the waveform $V_1$ becomes a value smaller than the waveform $V_0$ in the non-contact state. After that, by the voltage detection circuit 106, the detected voltage and predetermined threshold voltage $V_th$ are compared with each other. When the detected voltage is equal to or less than the threshold voltage Vth, the non-contact state is determined. On the other hand, when the detected voltage is larger than the threshold voltage Vth, the contact state is determined. In such a manner, a touch is detected.

First Embodiment

Figure 4:
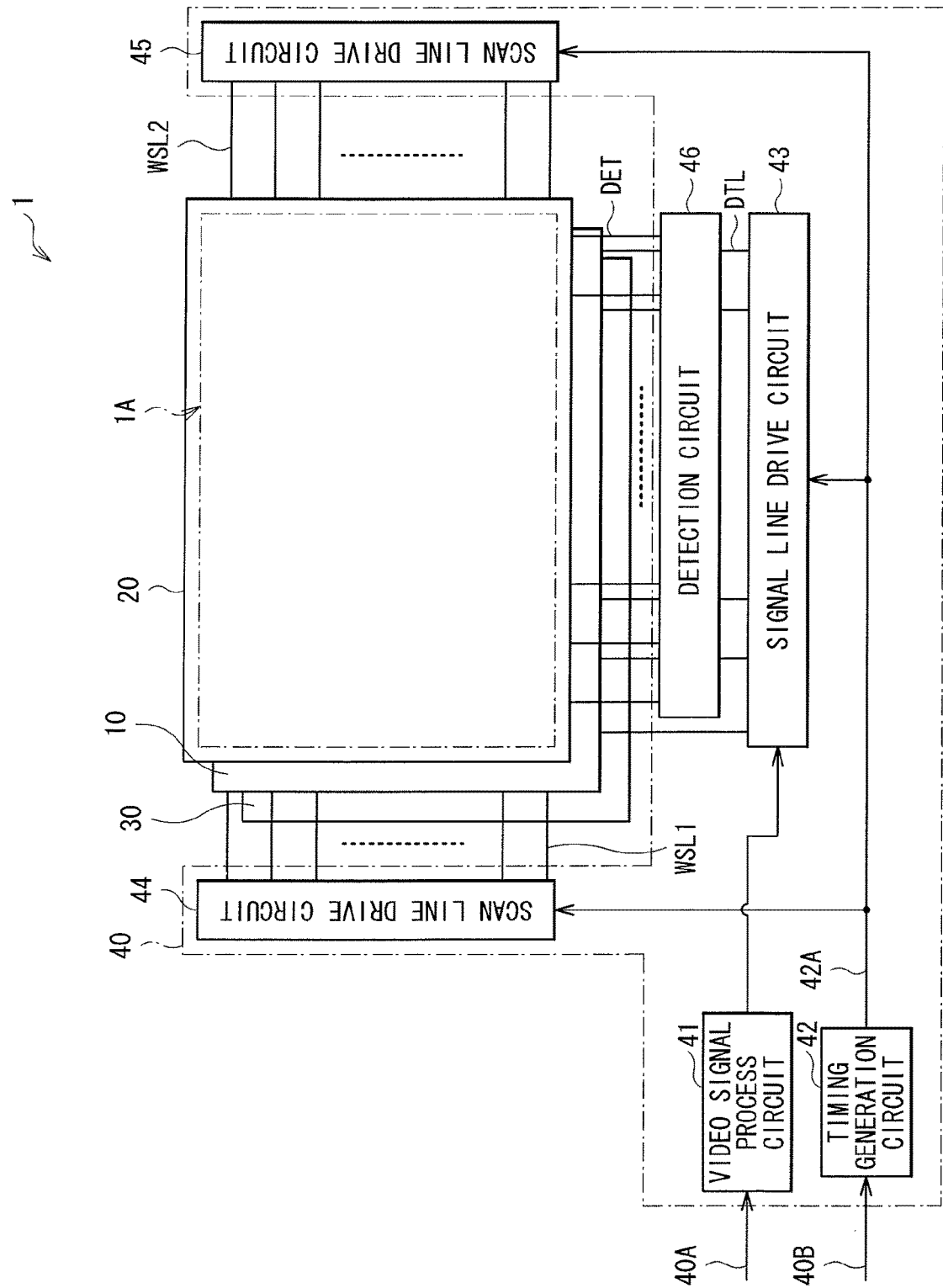
FIG. 4 is a diagram illustrating a schematic configuration of a liquid crystal display device according to a first embodiment of the invention.

FIG. 4 illustrates an example of a sectional configuration of a liquid crystal display device 1 according to a first embodiment of the invention. The liquid crystal display device 1 is a liquid crystal display device with a touch sensor. As a display element, a liquid crystal display element is provided. Further, on the surface of the liquid crystal display element, a touch sensor of the electrostatic capacitance type is provided separately from the liquid crystal display element.

The liquid crystal display device 1 has, for example, as illustrated in FIG. 4, a liquid crystal display panel 10, a touch panel 20, a backlight 30, and a peripheral circuit 40. The touch panel 20 is disposed on the side of an observer (front) of the liquid crystal display panel 10, and the backlight 30 is disposed on the rear side of the liquid crystal display panel 10.

[Liquid Crystal Display Panel 10]

Figure 5:
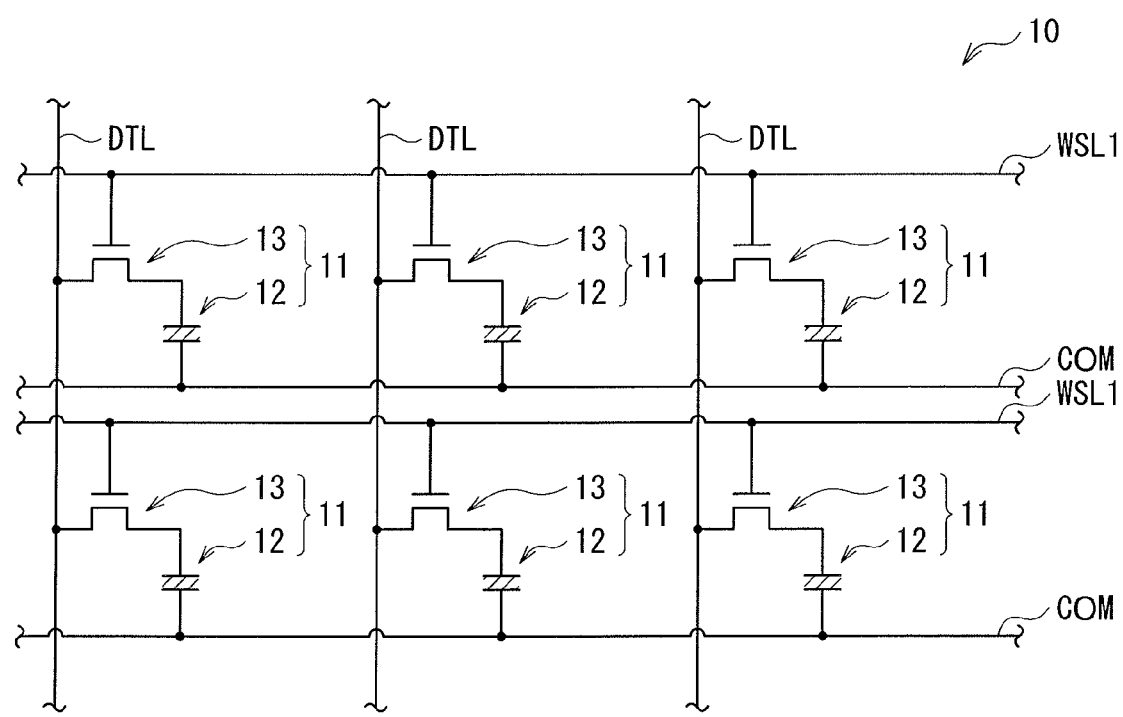

The liquid crystal display panel 10 displays a video image by transmitting or modulating light from the lights source (backlight 30) by changing arrangement of liquid crystal molecules. The liquid crystal display panel 10 is, for example, a transmission-type display panel in which a plurality of pixels 11 (refer to FIG. 5) disposed in matrix are driven in accordance with a video signal 40A. For example, as shown in FIG. 5, the liquid crystal display panel 10 has a plurality of scan lines WSL1 disposed as rows and a plurality of signal lines DTL disposed as columns. The plurality of pixels 11 are disposed in matrix in correspondence with intersections between the scan lines WSL1 and the signal lines DTL. In the liquid crystal display panel 10, further, for example, as shown in FIG. 5, a plurality of common connection lines COM are disposed as rows. For example, each of the common connection lines COM is arranged for one row of pixels 11.

Each pixel 11 includes, for example, as shown in FIG. 5, a liquid crystal element 12 and a transistor 13. One end of the liquid crystal element 12 is connected to the drain of the transistor 13, and the other end of the liquid crystal element 12 is connected to the common connection line COM. The gate of the transistor 13 is connected to the scan line WSL1, and the source of the transistor 13 is connected to the signal line DTL. The liquid crystal element 12 modulates light passing therethrough in accordance with a state of electric field, and is provided in the liquid crystal display panel 10. The internal configuration of the liquid crystal element 12 will be described in detail later. The transistor 13 is provided to drive the liquid crystal element 12, and is structured by, for example, a TFT (Thin Film Transistor).

Figure 6:
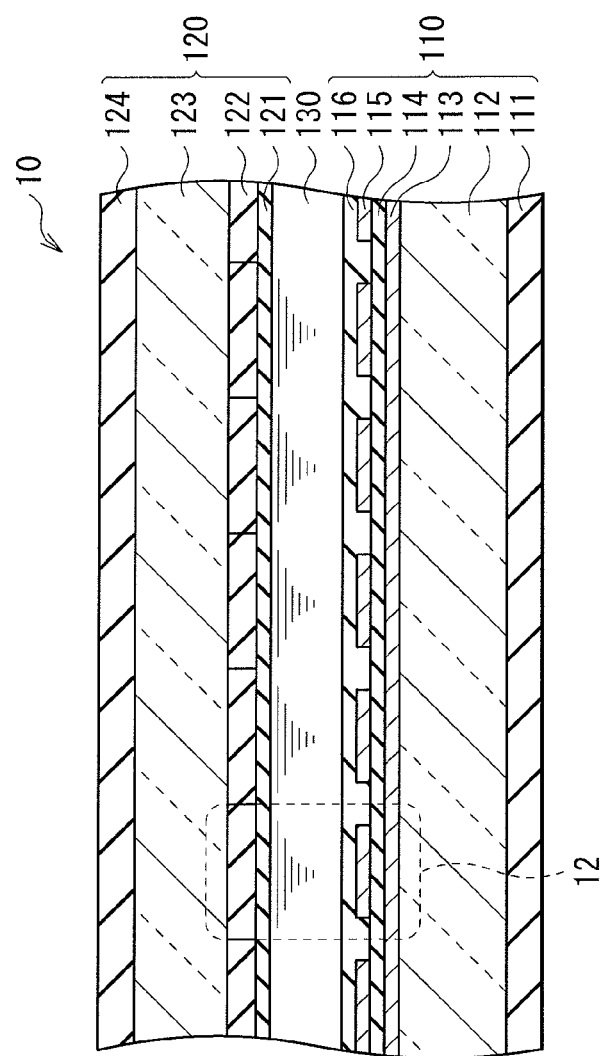
FIG. 6 is a diagram illustrating an example of a sectional configuration of the liquid crystal display panel shown in FIG. 4.

The liquid crystal display panel 10 has, for example, as illustrated in FIG. 6, a liquid crystal layer 130 (display function layer), and a light-incidence-side substrate 110 and a light-outgoing-side substrate 120 which are disposed opposing to each other while sandwiching the liquid crystal layer 130. The liquid crystal layer 130 modulates light according to the state of the electric field, thereby expressing the display function, and includes, for example, liquid crystal molecules in the transverse electric mode. Examples of liquid crystal molecules in the transverse electric mode include electric crystal molecules in the FFS (Fringe Field Switching mode) and liquid crystal molecules in the IPS (In-Plane Switching) mode.

The light-incidence-side substrate 110 is a transparent substrate disposed on the incident side (backlight 30 side) of light from the backlight 30 in the liquid crystal display panel 10. The light-incidence-side substrate 110 has, for example, in order from the backlight 30 side, a polarizer 111, a transparent substrate 112, a plurality of common electrodes 113, an insulation layer 114, a plurality of pixel electrodes 115, and an alignment film 116. On the other hand, the light-outgoing-side substrate 120 is a transparent substrate disposed on the outgoing side (observer side) of light modulated by the liquid crystal layer 130 in the liquid crystal display panel 10. The light-outgoing-side substrate 120 has, for example, in order from the liquid crystal layer 130 side, an alignment film 121, a color filter 122, a transparent substrate 123, and a polarizer 124. The color filter 122 may not be provided as necessary.

The liquid crystal element 12 corresponds to, for example, as shown by a broken line in FIG. 6, a portion facing one pixel electrode 115 in the liquid crystal display panel 10. The liquid crystal element 12 includes, for example, the transparent substrate 112, the common electrode 113, the insulation layer 114, the pixel electrode 115, the alignment film 116, the liquid crystal layer 130, the alignment film 121, the color filter 122, and the transparent substrate 123 in this order.

The polarizers 111 and 124 are a kind of an optical shutter, and transmit only light in a certain vibration direction (polarized light). The polarizers 111 and 124 are disposed in crossed nicols. For example, the polarizer 111 is disposed so that its transmission axis becomes parallel to the column direction, and the polarizer 124 is disposed so that its transmission axis becomes parallel to the row direction. With this configuration, the liquid crystal display panel 10 transmits or interrupts light emitted from the backlight 30 via the liquid crystal layer 130.

The transparent substrates 112 and 123 are substrates, for example, plate glass transparent to visible light. In the transparent substrate 112, for example, active drive circuits including the transistor, the signal line DTL, the scan line WSL1, and the common connection line COM are formed.

The common electrode 113 and the pixel electrode 115 are made of a material transparent to visible light, which can be, for example, ITO (Indium Tin Oxide). The common electrode 113 is the common connection line COM itself or a part of the common connection line COM. The plurality of common electrodes 113 have, for example, a band-like shape extending in the row direction and are disposed in parallel. The common electrode 113 functions, for example, as an electrode common to the pixels 11 by row. Incidentally, the plurality of common electrodes 113 may be integrated as a single plate-shaped electrode.

On the other hand, the plurality of pixel electrodes 115 are, for example, in lattice arrangement or delta arrangement on the transparent substrate 112. The pixel electrode 115 functions as, for example, an electrode for each pixel 11. The plurality of pixel electrodes 115 are, for example, disposed side-by-side via predetermined gaps on a region opposing one common electrode 113. The electric field formed between the pixel electrode 115 and the common electrode 113 is directed in the transverse direction (row direction) in the region of the liquid crystal layer 130.

The insulation layer 114 is provided for insulation between the common electrode 113 and the pixel electrode 115, and is made of, for example, $SiO_2$ or the like. The alignment films 116 and 121 are made of a high polymer material such as polyimide, and have the function of making the liquid crystal included in the liquid crystal layer 130. The alignment films 116 and 121 are subjected to rubbing processes so that, for example, the rubbing directions thereof become parallel to the transmission axis of one of the polarizers 111 and 124. For example, the rubbing directions of the alignment films 116 and 121 are parallel to the row direction (the extension direction of the common electrode 113). The color filter 122 is provided to separate the color of light having passed through the liquid crystal layer 130 to, for example, three primary colors of red (R), green (G), and blue (B), or four colors of R, G, B, and white (W).

[Touch Panel 20]

The touch panel 20 allows information to be entered by touching an image display face 1A (the surface of the touch panel 20) of the liquid crystal display device 1 with an object (i.e., an external proximity object). The object can be a finger, a pen, or other suitable member which is in contact with or in close to the image display face 1A, for example. The touch panel 20 is provided separately from the liquid crystal display panel 10 and, for example, is attached to the surface of the liquid crystal display panel 10 via an adhesive (not shown) or the like. The touch panel 20 corresponds to an illustrative example of the above-described touch sensor of the electrostatic capacitance type, and detects the contact or non-contact state by XY (row/column) matrix.

Figure 7:
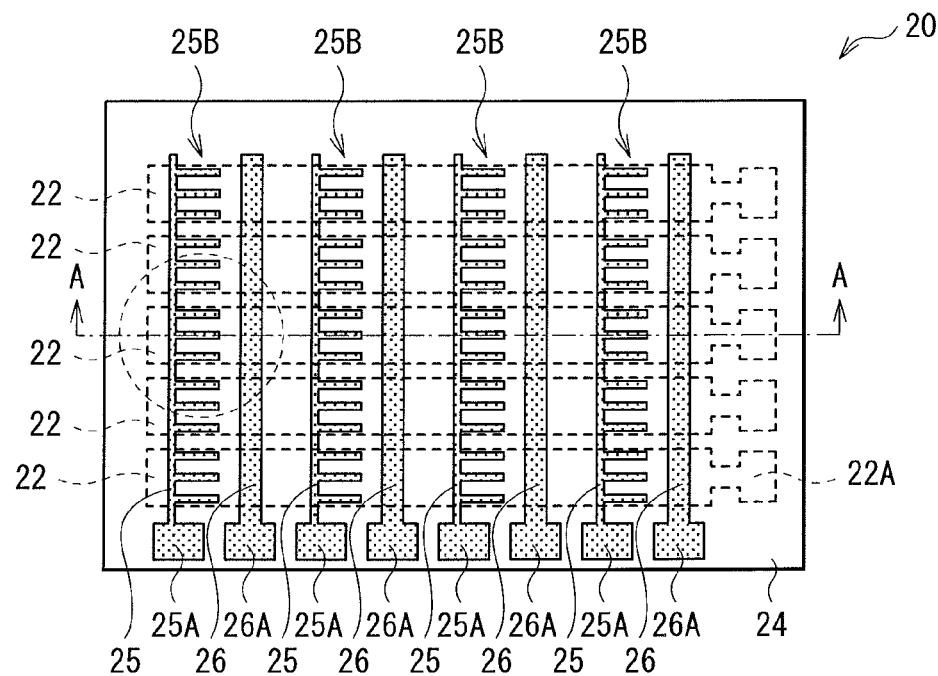
FIG. 7 is a diagram illustrating an example of a top face configuration of a touch panel shown in FIG. 4.
Figure 8:
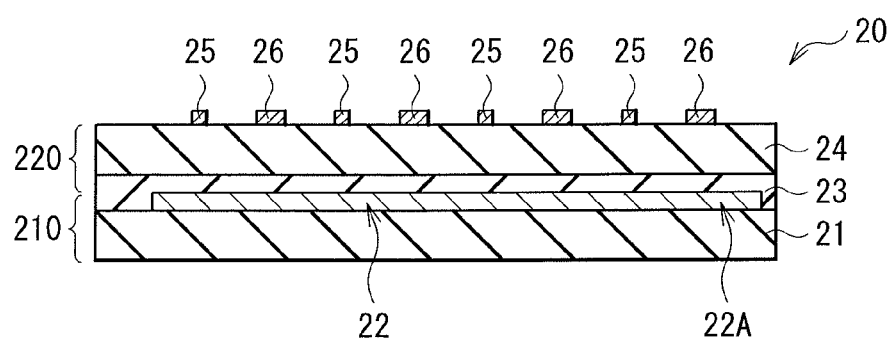
FIG. 8 is a diagram illustrating an example of a sectional configuration of the touch panel shown in FIG. 4.

FIG. 7 illustrates an example of the top face configuration of the touch panel 20. FIG. 8 illustrates an example of a sectional configuration taken along line A-A of the touch panel 20 in FIG. 7. For example, as shown in FIGS. 7 and 8, the touch panel 20 has a scan-side substrate 210 and a detection-side substrate 220 which are disposed opposing to each other via an adhesion layer 23.

The scan-side substrate 210 is a transparent substrate disposed on the side (the side of the liquid crystal display panel 10) on which light from the liquid crystal display panel 10 is incident in the touch panel 20. The scan-side substrate 210 has, for example, in order form the side of the liquid crystal display panel 10, a transparent substrate 21 and a plurality of scan electrodes 22. On the other hand, the detection-side substrate 220 is a transparent substrate disposed on the side (the observer side) from which light having passed through the touch panel 20 goes out. The detection-side substrate 220 has, for example, in order from the side of the liquid crystal display panel 10, a transparent substrate 24, a plurality of detection electrodes 25 (first detection electrodes), and a plurality of detection electrodes 26 (second detection electrodes).

In the touch panel 20, for example, a capacitive element is structured by an adhesion layer 23, the transparent substrate 24, and the scan electrode 22 and the detection electrode 25 which are disposed opposing to each other via the adhesion layer 23 and the transparent substrate 24. The capacitive element functions as the touch sensor of the electrostatic capacitance type in the touch panel 20. In the touch panel 20, the detection electrodes 25 and 26 may be formed on the top face (the surface of the touch panel 20) of the transparent substrate 24, or the under face of the transparent substrate 24. In the case where the detection electrodes 25 and 26 are formed on the under face of the transparent substrate 24, the capacitive element is structured by the adhesion layer 23, and the scan electrode 22 and the detection electrodes 25 and 26 disposed opposing to one another via the adhesion layer 23.

The transparent substrates 21 and 24 are substrates transparent to visible light, which can be, for example, light-transmission resin films. The scan electrode 22 and the detection electrodes 25 and 26 are made of a material transparent to visible light, which can be, for example, ITO.

The scan electrode 22 corresponds to one of electrodes of the electrostatic capacitance type touch sensor, and is electrically connected to a scan line WSL2 (refer to FIG. 4). The scan electrode 22 is formed, for example, in contact with the surface of the transparent substrate 21. The plurality of scan electrodes 22 have, for example, a band-like shape extending in a row direction (first direction) and are disposed in parallel with each other. Each of the scan electrodes 22 extends, for example, in a direction parallel with the common electrode 113 in the liquid crystal display panel 10. At one end of each scan electrode 22, the connection pad 22A to be connected to the peripheral circuit 40 is formed.

Figure 9:
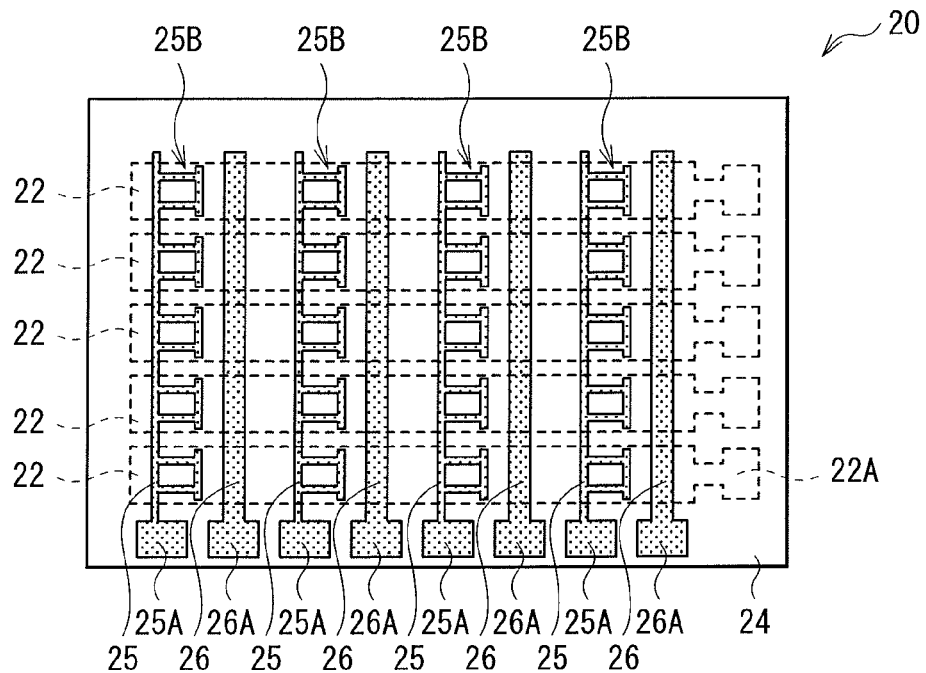
FIG. 9 is a diagram illustrating another example of the top face configuration of the touch panel shown in FIG. 4.
Figure 10:
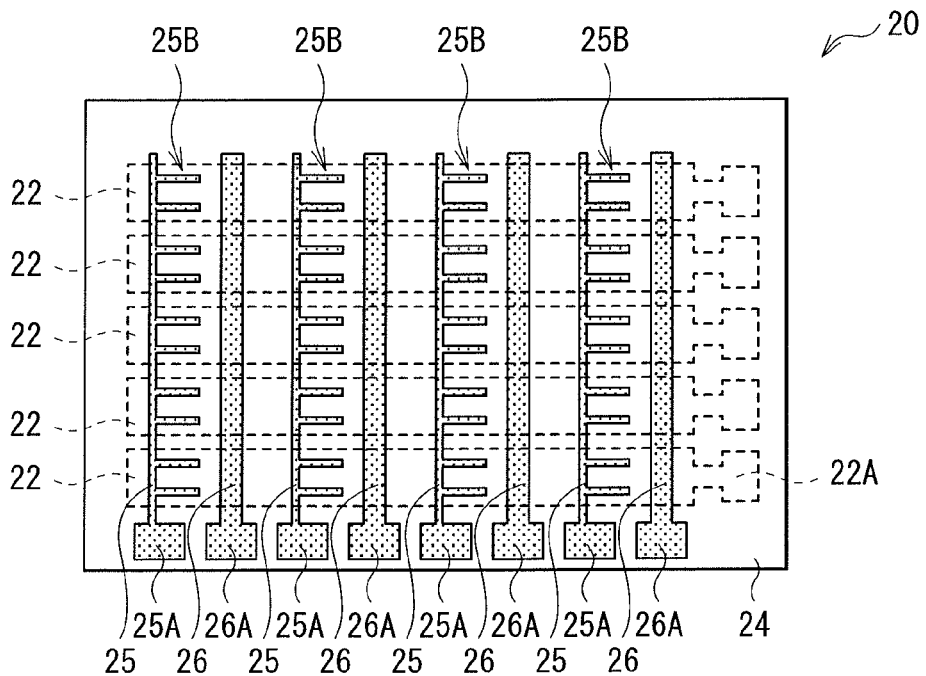
FIG. 10 is a diagram illustrating another example of the top face configuration of the touch panel shown in FIG. 4.

The detection electrode 25 corresponds to the other electrode of the touch sensor of the electrostatic capacitance type, and is electrically connected to a detection line DET (refer to FIG. 4). The detection electrode 25 is, for example, formed in contact with the surface of the transparent substrate 24. The plurality of detection electrodes 25 have a band-shape electrode part extending in a direction (for example, column direction) (second direction) crossing the extending direction of the scan electrodes 22, and are disposed parallel with each other. The electrode part of the detection electrodes 25 faces any of the scan electrodes 22. As shown in FIG. 7, the detection electrode 25 has a plurality of projection parts 25B coupled to the electrode part. The projection parts 25B are disposed in, for example, a region facing the scan electrodes 22. The projection part 25B protrudes in a direction (for example, the row direction) crossing the extension direction of the electrode part and has, for example, a rod-like shape as shown in FIG. 7. The detection electrode 25 has, for example, a comb-like shape formed by the electrode part, and the plurality of projection parts 25B. The projection part 25B does not always have to have the rod-like shape but may have, for example, as shown in FIG. 9, an annular shape. Also, three projection parts 25B may be provided in each region facing the scan electrode 22 as shown in FIG. 7, or two projection parts 25B may be provided in each region facing the scan electrode 22 as shown in FIG. 10. At one end of each detection electrode 25, a connection pad 25A to be connected to the peripheral circuit 40 is formed. Preferably, the connection pads 25A are disposed near one common side in the surface of the transparent substrate 24. Where appropriate, the connection pads 25A may be disposed dispersedly near a plurality of sides of the surface of the transparent substrate 24.

The detection electrode 26 also corresponds to the other electrode in the capacitive element, and is electrically connected to a detection line DET (refer to FIG. 4). The detection electrode 26 is formed in the same plane as that of the detection electrode 25, and is formed in contact with, for example, the surface of the transparent substrate 24. The plurality of detection electrodes 26 have a band-like shape extending in a direction (for example, the column direction) crossing the extension direction of the scan electrode 22, and are arranged in parallel with each other. The detection electrode 26 faces any of the scan electrodes 22. The detection electrode 26 is not provided with a structure similar to that of the projections 25B. Therefore, the detection electrode 26 has a shape different from that of the detection electrode 25. At one end of each detection electrode 26, a connection pad 26A to be connected to the peripheral circuit 40 is formed. Preferably, the connection pads 26A are disposed close to one common side in the surface of the transparent substrate 24 together with the connection pads 25A. Where appropriate, the connection pads 26A may be disposed dispersedly near a plurality of sides of the surface of the transparent substrate 24.

A line width of the detection electrode 25 is narrower than that of the detection electrode 26 in each of the electrode part and the projection part 25B. In the detection electrode 25, the electrode part has a line width of, for example, about 100 µm, and the projection part 25B has a line width of, for example, about 10 µm. On the other hand, a line width of the detection electrode 26 is wider than that of the detection electrode 25, and has, for example, a line width of about 500 µm.

The detection electrodes 25 and 26 are disposed so that at least one detection electrode 25 and one detection electrode 26 are provided just below a contact part between the object such as the finger or the pen and the image display face 1A (for example, a part surrounded by a broken-line circle in FIG. 7) when the object touches the image display face 1A. That is, the detection electrodes 25 and 26 are disposed so that the gap between the neighboring detection electrodes 25 and 26 becomes smaller than the diameter of the contact part. Further, the detection electrodes 25 and 26 are formed so that, for example, when the image display surface 1A is touched with the object such as the finger or the pen, a capacitance (capacitance C) formed between the detection electrode 25 and the object and a capacitance (capacitance D) formed between the detection electrode 26 and the object are almost equal to each other. To make the detection electrodes 25 and 26 easily satisfy such a condition, for example, as illustrated in FIGS. 7, 9, and 10, preferably, the detection electrodes 25 and 26 are disposed alternately in the row direction. Also, for example, as illustrated in FIGS. 7, 9, and 10, preferably, the projection parts 25B of the detection electrode 25 are disposed closer to the adjacent detection electrode 26 as compared with the electrode parts of the detection electrode 25. Further, for example, as illustrated in FIGS. 7, 9, and 10, preferably, the area of a part facing one scan electrode 22, of the detection electrode 25 and the area of a part facing one scan electrode 22, of the detection electrode 26 are equalized to each other.

[Backlight 30]

The backlight 30 illuminates the back of the liquid crystal display panel 10, and has, for example, a light guide plate, a light source disposed on a side face of the light guide plate, and an optical element disposed on the top face (light outgoing face) of the light guide plate. The light guide plate guides light from the light source to the top face of the light guide plate, and, for example, has a shape formed in a predetermined pattern in one of the top face and the under face, and has the function of scattering light incident from the side face so as to uniform the light. The light source is a linear light source, and is made by, for example, an HCFL (Hot Cathode Fluorescent Lamp), CCFL, or a plurality of LEDs disposed linearly. The optical element is structured by, for example, stacking a diffuser, a diffusion sheet, a lens film, a polarization separation sheet, or the like.

[Peripheral Circuit 40]

Next, circuits in the peripheral circuit 40 will be described with reference to FIG. 4. The peripheral circuit 40 drives the liquid crystal display panel 10 and the touch panel 20, and detects an output of the above-described touch sensor of the electrostatic capacitance type, for example. The peripheral circuit 40 is, for example, mounted on the light-incidence-side substrate 110 in the liquid crystal display panel 10, or connected to a flexible print circuit board (FPC) connected to the liquid crystal display panel 10 and the touch panel 20, for example. The peripheral circuit 40 has, for example, a video signal process circuit 41 (first drive section), a timing generation circuit 42, a signal line drive circuit 43, a scan line drive circuit 44, a scan line drive circuit 45 (second drive section), and a detection circuit 46 (detection section).

The video signal process circuit 41 corrects, for example, the digital video signal 40A which is input from the outside, converts the corrected video signal to an analog signal, and outputs the analog signal to the signal line drive circuit 43. The timing generation circuit 42 controls, for example, so that the signal line drive circuit 43 and the scan line drive circuits 44 and 45 operate in conjunction with one another. The timing generation circuit 42 outputs, for example, a control signal 42A to those circuits according to (synchronously with) a sync signal 40B which is input from the outside.

The signal line drive circuit 43 applies an analog video signal (a signal potential corresponding to the video signal 40A) input from the video signal process circuit 41 to signal lines DTL to write the analog video signal to the selected pixels 11. The signal line drive circuit 43, for example, outputs a signal potential corresponding to the video signal 40A. The signal line drive circuit 43, for example, performs frame inversion driving of writing a signal to the selected pixels 11, by applying a signal potential, which inverts every frame period with respect to reference potential, to each of the signal lines DTL. The frame inversion driving is performed to suppress deterioration in the liquid crystal element 12, and is used where appropriate. Further, the signal line drive circuit 43, for example, also performs 1H inversion drive of writing a signal to the selected pixels 11, by applying a signal potential, which inverts every 1H period with respect to the reference potential, to each of the signal lines DTL. The 1H inversion driving is performed to suppress occurrence of flicker in each frame due to inversion of the polarity of a voltage applied to the liquid crystal element 12, and is used where appropriate. Here, the reference potential is a potential of the common connection line COM, and is, for example, a ground potential.

The scan line drive circuit 44 sequentially applies a selection pulse to a plurality of scan lines WSL1 according to (synchronously with) input of the control signal 42A to select a plurality of pixels 11 by desired unit. As the unit of selecting the pixels 11, for example, as needed basis, various units may be selected such as one line or neighboring two lines. The selection of the pixels 11 may be, for example, sequential selection or random selection. The scan line drive circuit 44 outputs, for example, a voltage applied to turn on the transistor 13 and a voltage applied to turn off the transistor 13.

The scan line drive circuit 45 sequentially applies a selection pulse to a plurality of scan lines WSL2 according to (synchronously with) input of the control signal 42A to select a plurality of scan electrodes 22 by desired unit. As the unit of selecting the scan electrodes 22, for example, as needed basis, various units may be selected such as one line or neighboring two lines. The selection of the scan electrodes 22 may be, for example, sequential selection or random selection.

Figure 11:
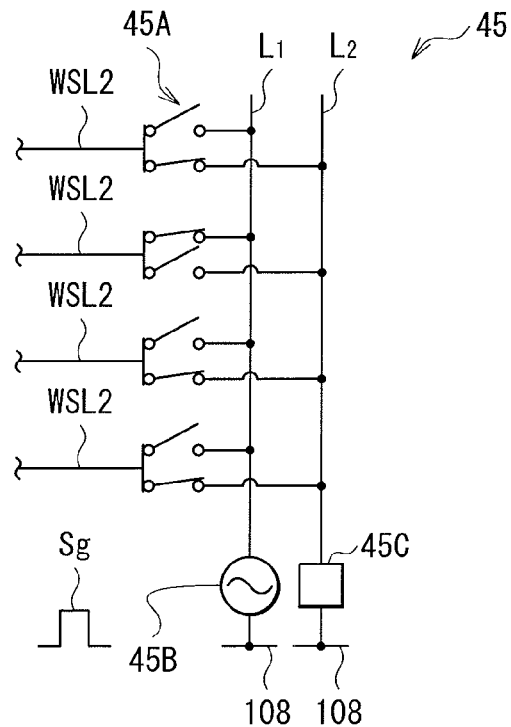
FIG. 11 is a diagram illustrating an example of a schematic configuration of a scan line drive circuit shown in FIG. 4.

The scan line drive circuit 45 has, for example, as illustrated in FIG. 11, a switching element 45A connected to one end of the scan line WSL2. The other end of the scan line WSL2 is electrically connected to the scan electrode 22 (the connection pad 22A). One switching element 45A is provided for each scan line WSL2, and has, for example, two input terminals. One input terminal of the switching element 45A is, for example, connected to an AC signal source 45B via a line $L_1$. The AC signal source 45B outputs an AC rectangular wave Sg of a predetermined frequency (for example, a few kHz to tens kHz). The other input terminal of the switching element 45A is connected to, for example, a logic circuit 45C via a line $L_2$. The logic circuit 45C outputs, for example, a predetermined fixed potential (for example, a potential in the range of 0V to 5V). The AC signal source 45B and the logic circuit 45C are, for example, connected to the reference potential line 108 or the like as illustrated in FIG. 11. The reference potential line 108 is, for example, a line connected to the member which applies the potential as the reference of the circuit operation in the liquid crystal display device 1. The scan line drive circuit 45 may be constructed by circuits different from those illustrated in FIG. 11.

Next, the detection circuit 46 will be described. The detection circuit 46 detects the contact position of the object such as a finger, on the basis of a detection signals $V_{det}$ obtained from the plurality of detection electrodes 25 and 26. More specifically, the detection circuit 46 detects whether the object such as the finger is in contact with the image display face 1A or not, on the basis of the difference between the detection signal $V_{det}$ obtained from the detection electrode 25 and the detection signal $V_{det}$ obtained from the detection electrode 26. When the difference is equal to or less than the predetermined threshold voltage Vth, the detection circuit 46 determines that the object is in contact with the image display face 1A. When the difference exceeds the predetermined threshold voltage Vth, the detection circuit 46 determines that the object is not in contact with the image display face 1A. When it is detected that the object such as the finger is in contact with the image display face 1A, the detection circuit 46 executes the following process. Specifically, the detection circuit 46 calculates the position of contact of the object such as the finger in the image display face 1A, on the basis of the timing of applying the selection pulse output from the scan line drive circuit 45 and the timing of detecting the difference which is equal to or less than the threshold voltage $V_{th}$.

Figure 12:
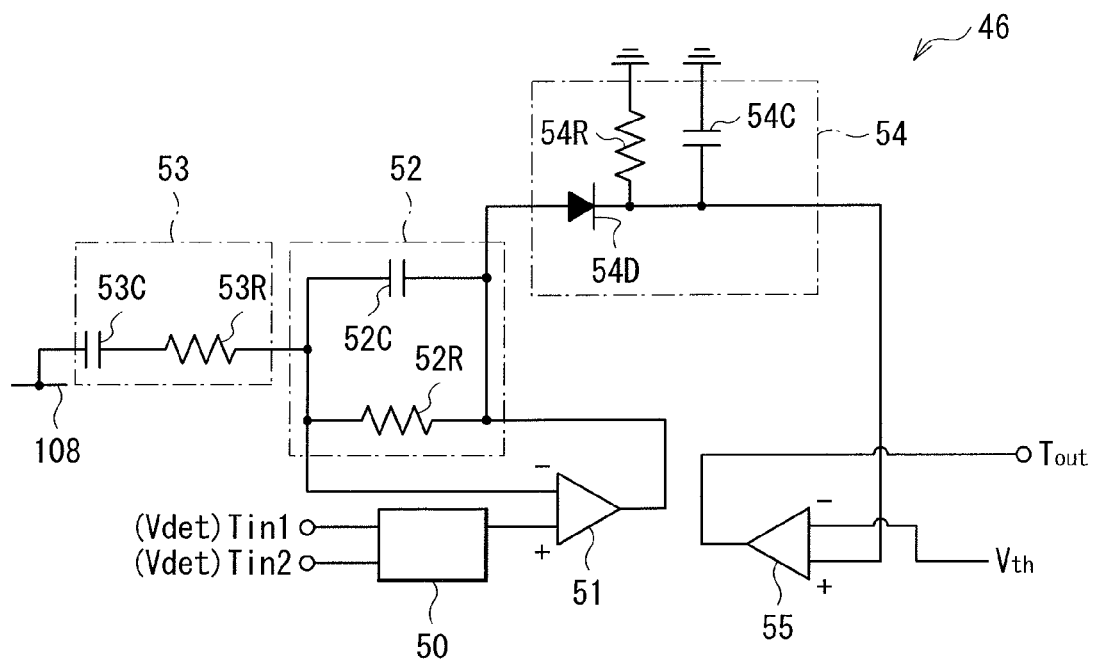
FIG. 12 is a diagram illustrating an example of a schematic configuration of a detection circuit shown in FIG. 4.

The detection circuit 46 has, for example, as shown in FIG. 12, a differential circuit 50 at an input stage. The detection circuit 46 has, for example, at the post stage of the difference circuit 50, an operational amplifier 51 for amplifying a signal, a low pass filter (LPF) 52, a high pass filter (HPF) 53, a rectifying and smoothing unit 54, and a comparator 55. Two input terminals $T_{in1}$ and $T_{in2}$ of the difference circuit 50 are electrically connected to the detection electrodes 25 and 26 (the connection pads 25A and 26A). Therefore, to the input terminals $T_{in1}$ and $T_{in2}$, the detection signal $V_{det}$ output from the detection electrode 25 and the detection signal $V_{det}$ output from the detection electrode 26 are input. The positive input terminal (+) of the operational amplifier 51 is connected to the output terminal of the difference circuit 50, and the output terminal of the operational amplifier 51 is connected to the rectifying and smoothing unit 54 via the LPF 52. To the LPF 52, the HPF 53 is connected. The LPF 52 has a configuration that, for example, a resistor 52R and a capacitor 52C are connected in parallel. The HPF 53 has a configuration that, for example, a resistor 53R and a capacitor 53C are connected in series in the reference potential line 108. The connection point between the LPF 52 and the HPF 53 is connected to the negative input terminal (—) of the operational amplifier 51. The rectifying and smoothing unit 54 has, for example, a rectifying unit configured of a half-wave rectifier diode 54D, and a smoothing unit obtained by connecting a resistor 54R and the capacitor 52C in parallel in the reference potential line 108. The output terminal of the rectifying and smoothing unit 54 is connected to the positive input terminal (+) of the comparator 55. The predetermined threshold voltage $V_{th}$ is input to the negative input terminal (−) of the comparator 55. The output terminal of the comparator 55 is connected to the output terminal $T_{out}$, and the output terminal $T_{out}$ is connected to a not-shown computing circuit. Therefore, on the basis of a detection result (contact or non-contact) output from the output terminal $T_{out}$, a predetermined information process is performed by the computing circuit.

The detection circuit 46 having such a configuration operates as follows. The difference between the two detection signals $V_{det}$ input to the input terminals $T_{in1}$ and $T_{in2}$ is calculated by the difference circuit 50, and a signal (differential signal) obtained by the calculation is amplified by the operational amplifier 51. After that, low frequency components of the signal pass through the LPF 52, and high frequency components are removed by the HPF 53. The AC components of low frequency having passed through the LPF 52 are subjected to half-wave rectification by the diode 54D of the rectifying and smoothing unit 54. After that, the resultant becomes a smoothed level signal, and the level signal is input to the comparator 55. In the comparator 55, the input level signal is compared with the threshold voltage $V_{th}$. When the level signal is equal to or less than the threshold voltage $V_{th}$, a touch detection signal is output from the comparator 55. When the touch detection signal is input to the computing circuit, in the computing circuit, the touch position is calculated on the basis of the application timing of the selection pulse and the detection timing of the detection signal $V_{det}$ which is equal to or less than the threshold voltage $V_{th}$. Incidentally, the detection circuit 46 may be structured by circuits different from those shown in FIG. 12.

[Operation]

An example of the operation of the liquid crystal display device 1 according to the present embodiment will now be described.

In the liquid crystal display device 1, the signal potential corresponding to the video signal 40A is applied to the signal lines DTL by the signal line drive circuit 43, and the selection pulse according to the control signal 42A is sequentially applied to the plurality of scan lines WSL1 by the scan line drive circuit 44. Consequently, a transverse electric field having a magnitude corresponding to the signal potential is applied on the pixel 11 unit basis to the liquid crystal layer 130, and the liquid crystal molecules are aligned in a predetermined direction. Therefore, the light from the backlight 30 is modulated on the pixel 11 unit basis in the liquid crystal layer 130 in accordance with the alignment direction of the liquid crystal molecules. As a result, an image is displayed on the image display face 1A.

In the liquid crystal display device 1, further, the selection pulse is sequentially applied to the plurality of scan lines WSL2 by the scan line drive circuit 45. Thus, capacitive elements (corresponding to the capacitive elements 104) each formed in the intersection part of the scan electrode 22 and the detection electrode 25 are sequentially changed/discharged, and the detection signal $V_{det}$ of the level based on the capacitance value of the capacitive element is output from each of the plurality of detection electrodes 25. The outputs (detection signals $V_{det}$) from the plurality of detection electrodes 25 are input to the detection circuit 46. In a state where a finger of the user is not in contact with the surface of the touch panel 20, the level of the detection signal $V_{det}$ is almost constant.

When a finger of the user touches any place in the surface of the touch panel 20, a capacitive element formed by the finger or the like (the capacitive element corresponding to the capacitive element 109) is added to the capacitive element formed in the position where the finger or the like is touched. Consequently, the difference of the two detection signals $V_{det}$ output from the detection electrodes 25 and 26 when the selection pulse is applied to the scan electrode 22 corresponding to the touch position becomes smaller than the difference of the two detection signals Vdet output from the electrodes 25 and 26 when the selection pulse is applied to another place. In the detection circuit 46, that difference is compared with the threshold voltage $V_{th}$. For example, when the difference is equal to or less than the threshold voltage $V_{th}$, it is determined that the finger or the like is in contact with the surface of the touch panel 20. The contact position is determined from the application timing of the selection pulse and the detection timing of the detection signal $V_{det}$ which is equal to or less than the threshold voltage $V_th$ in the detection circuit 46.

[Operation and Effects]

Next, the operation and effects of the liquid crystal display device 1 according to the present embodiment will be described.

Generally, in a detection method of the electrostatic capacitance type, due to the principle of the method, when a finger or the like of the user touches the surface of the touch panel, the capacitive element formed by the finger or the like has to be added to the detection electrode provided in the touch panel. Thus, the detection electrode is provided on or near the surface of the touch panel, although external noise thereby easily enters the detection electrode. In particular, when the touch panel is used for a mobile device, the user holding the mobile device by his/her hand becomes an antenna and receives external noise, and the received noise enters the detection electrode via the hand of the user. When the noise enters the detection electrode, an output of the detection electrode (the value of the detection signal) fluctuates. Thus, contact/non-contact may be erroneously determined.

Figure 13:
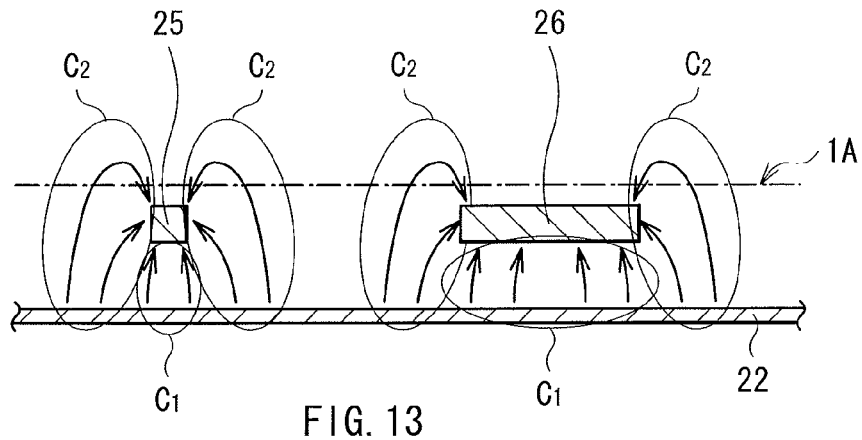
FIG. 13 is a schematic diagram for explaining fringe capacitance in the touch panel illustrated in FIG. 7.

However, in the present embodiment, the two kinds of the detection electrodes 25 and 26 having different line widths are provided for the touch panel 20, as one of the electrodes of the touch sensor of the electrostatic capacitance type used for detecting the contact/non-contact state. The detection electrodes 25 and 26 are disposed opposing to the scan electrode 22 via the predetermined gap. Thus, when voltage is applied between the scan electrode 22 and the detection electrodes 25 and 26, for example, lines of electric force as illustrated in FIG. 13 are generated between the scan electrode 22 and the detection electrodes 25 and 26. In the gap between the scan electrode 22 and the detection electrodes 25 and 26, the lines of electric force extend almost straight. By the electric fields generated in the gap, a parallel plate capacitance $C_1$ is formed. On the other hand, around the gap between the scan electrode 22 and the detection electrodes 25 and 26, the lines of electric force extend largely around the top face side of the detection electrodes 25 and 26, and extend to the observer side more than the image display face 1A with which a finger or the like comes in contact. By the round electric field, a fringe capacitance $C_2$ is formed.

Although the parallel plate capacitance $C_1$ and the fringe capacitance $C_2$ are formed for both of the detection electrodes 25 and 26 as described above, a region in which the parallel plate capacitance $C_1$ is formed in the detection electrode 25 having the narrower line width is smaller than that of the detection electrode 26 having the wider line width. That is, a value of the parallel plate capacitance $C_1$ in the detection electrode 25 is smaller than that in the detection electrode 26. On the other hand, a size of a region in which the fringe capacitance $C_2$ is formed largely does not have the relation with the line width, and is proportional to the length of an edge of the detection electrodes 25 and 26. For example, as shown in FIGS. 7, 9, and 10, since the detection electrode 25 is provided with the projections 25B, the edge of the detection electrode 25 is longer than that of the detection electrode 26 by the amount of the length of the edge included in the projection part 25B. Consequently, the region in which the fringe capacitance $C_2$ is formed in the detection electrode 25 is wider than that of the detection electrode 26 by the amount of the length of the edge included in the projection part 25B. Therefore, a rate of the fringe capacitance $C_2$ in the capacitance (total capacitance) obtained by adding the parallel plate capacitance $C_1$ and the fringe capacitance $C_2$ in the detection electrode 25 is larger than that in the detection electrode 26.

It is now assumed that a finger or the like is brought close to the detection electrodes 25 and 26 and interrupts the electric field forming the fringe capacitance $C_2$. Due to the interruption with the finger or the like, the fringe capacitance $C_2$ decreases, and, in association therewith, the total capacitance also decreases. A fluctuation rate (decrease rate) of the total capacitance in the detection electrode 25 is higher than that of the detection electrode 26. Therefore, when the plurality of scan electrodes 22 are selected in desired unit, the signal level of the detection signal Vdet obtained from the detection electrode 25 fluctuates largely between the time when the finger or the like touches the image display face 1A and the time when the finger or the like does not touch the image display face 1A. On the other hand, the signal level of the detection signal $V_{det}$ obtained from the detection electrode 26 fluctuates only by a fluctuation amount smaller than the fluctuation amount in the detection electrode 25, between the time when the finger or the like touches the image display face 1A and the time when the finger or the like does not touch the image display face 1A.

As described above, in the present embodiment, the sensitivity to touch of a finger or the like in the detection electrode 25 is higher than that in the detection electrode 26. Further, the sensitivity to touch of a finger or the like in the detection electrode 25 is almost constant regardless of the scan electrode 22. Similarly, the sensitivity to touch of a finger or the like in the detection electrode 26 is almost constant regardless of the scan electrode 22. In other words, in the present embodiment, the detection electrodes 25 and 26 having different sensitivities to touch of a finger or the like are provided for the touch panel 20.

Also, in the present embodiment, the detection electrodes 25 and 26 are formed so that, for example, when the object such as a finger or pen touches the image display face 1A, the capacitance (capacitance C) formed between the detection electrode 25 and the object, and the capacitance (capacitance D) formed between the detection electrode 26 and the object, are almost equalized. In the present embodiment, for example, as shown in FIGS. 7, 9, and 10, in the case where the detection electrodes 25 and 26 are disposed alternately in the row direction, or disposed so that the projections 25B of the detection electrode 25 are closer to the neighboring detection electrode 26 more than the electrode parts of the detection electrode 25, the capacitance C and the capacitance D are almost equalized. In the present embodiment, for example, as shown in FIGS. 7, 9, and 10, also in the case where the area of the part facing one scan electrode 22 in the detection electrode 25 and the area of the part facing one scan electrode 22 in the detection electrode 26 are equalized, the capacitance C and the capacitance D are almost equalized.

Consequently, for example, sensitivity to external noise in the detection electrode 25 and that in the detection electrode 26 are almost equalized when the user becoming as an antenna and catching the external noise touches the panel with his/her finger and the external noise is transmitted to the touch panel 20 via the finger. In the case where the sensitivity to the external noise of the detection electrode 25 and the sensitivity to the external noise of the detection electrode 26 are equal to each other, the signal level of the external noise included in the detection signal $V_{det}$ obtained from the detection electrode 25 and that of the external noise included in the detection signal $V_{det}$ obtained from the detection electrode 26 are equal to each other. Therefore, for example, by calculating the difference between the detection signal $V_{det}$ obtained from the detection electrode 25 and that obtained from the detection electrode 26, the external noise is eliminated from the detection signals.

Figure 14:
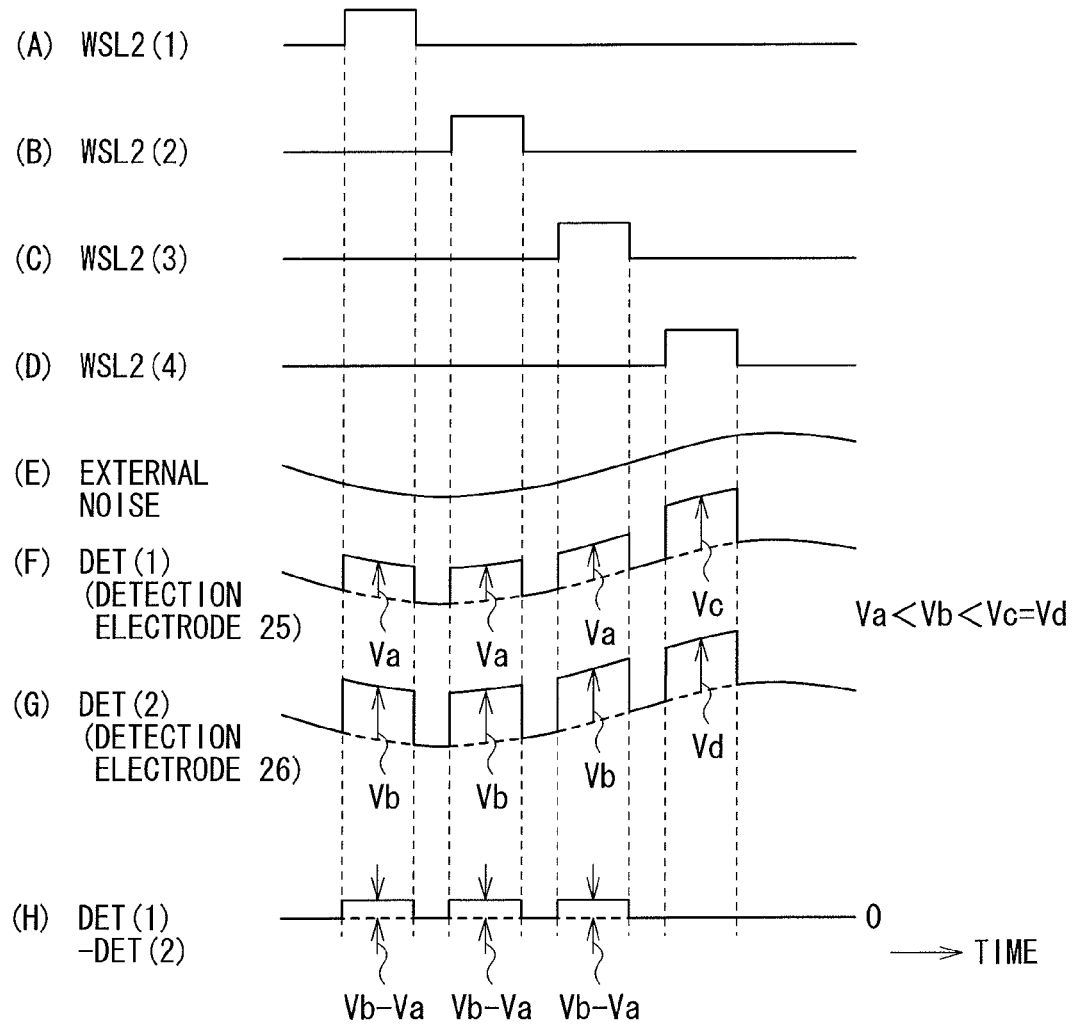
FIG. 14 is a diagram illustrating an example of waveforms of signals in the touch panel in FIGS. 7, 9, and 10.

Part (A) to Part (H) of FIG. 14 illustrate an example of signal waveforms when the detection electrodes 25 and 26 have the configuration as illustrated in FIG. 7, 9, or 10 and when, in a state the touch panel 20 is touched with a finger, the plurality of scan lines WSL2 are sequentially driven. In Parts (A) to (D) of FIG. 14, the number at the end of each of WSL2(1), WSL2(2), WSL2(3), and WSL2(4) indicates serial number (sequence number) of the scan line WSL2. The number at the end of each of DET(1) and DET(2) in Parts (F) and (G) of FIG. 14 indicates serial number (sequence number) of the detection lines DET. In Parts (F) to (H) of FIG. 14, DET(1) corresponds to the detection line DET connected to the detection electrode 25, and DET(2) corresponds to the detection line DET connected to the detection electrode 26. Parts (F) to (H) of FIG. 14 illustrate signal waveforms obtained when a finger touches a region opposing the crossing part of the first to third scan lines WSL2 and the first and second detection lines DET.

It can be seen from Parts (F) and (G) of FIG. 14, that when the first to third scan lines WSL2 are selected, the detection signal $V_{det}$ of the voltage Va is obtained from the first selection line DET, and the detection signal $V_{det}$ of a voltage Vb (>Va) is obtained from the second selection line DET. The reason why the signal level of the detection signal $V_{det}$ varies between the first selection line DET and the second selection line DET is that the sensitivity to touch with a finger or the like in the detection electrode 25 connected to the first selection line DET is higher than that in the detection electrode 26 connected to the second selection line DET.

It can also be seen from Parts (F) and (G) of FIG. 14 that, when the fourth scan line WSL2 is selected, the detection signal $V_{det}$ of the voltage Vc is obtained from the selection line DET(1), and the detection signal $V_{det}$ of a voltage Vd (=Vc) is obtained from the selection line DET. The reason why the signal level of the detection signal $V_{det}$ of the first selection line DET and that of the second selection line DET are the same is that a finger does not touch a part just above the fourth scan line WSL2 and the detection electrodes 25 and 26 are hardly influenced by the finger.

It can also be seen from Parts (E) to (G) of FIG. 14 that noise having the same phase as that of external noise is included at almost the same level in the detection signal $V_{det}$ obtained from the first selection line DET and the detection signal $V_{det}$ obtained from the second selection line DET. The reason is that the sensitivity to the external noise in the detection electrode 25 connected to the first selection line DET and that in the detection electrode 26 connected to the second selection line DET are almost equal to each other.

It can be seen from Part (H) of FIG. 14 that, by obtaining the difference between the detection signal $V_{det}$ obtained from DET(1) and the detection signal $V_{det}$ obtained from DET(2), a fluctuation component (Vb−Va) of the detection signal $V_{det}$ by touch of a finger is extracted. It can also be seen from Part (H) of FIG. 14 that noise having the same phase as that of the external noise is eliminated from the detection signal $V_{det}$.

From the above, by providing the two kinds of the detection electrodes 25 and 26 having the different sensitivities to the contact/non-contact state and having the almost equal sensitivities to the external noise, the external noise is eliminated from the detection signal $V_{det}$ only by calculating the difference of the detection signals $V_{det}$. Therefore, it is possible to eliminate the erroneous detection caused by the external noise.

Modification of First Embodiment

[Modification 1]

Although the case where one scan electrode 22 is connected to one scan line WSL2 has been described in the foregoing embodiment, the plurality of neighboring scan electrodes 22 may be connected to one scan line WSL2. In such a case, as compared with the case where one scan electrode 22 is connected to one scan line WSL2, the signal level of the detection signal $V_{det}$ obtained from the detection electrodes 25 and 26 becomes higher. Incidentally, only by simply increasing the line width of the scan electrode 22 and the detection electrodes 25 and 26, the signal level of the detection signal $V_{det}$ is made higher. However, in such a case, as described above, when the line width is increased, only the parallel plate capacitance $C_1$ increases, and the capacitance C and the capacitance D decrease. Therefore, the sensitivity to touch with a finger or the like decreases. On the other hand, as in the present modification, in the case of connecting the plurality of neighboring scan electrodes 22 to one scan line WSL2, not only the parallel plate capacitance $C_1$ but also the fringe capacitance $C_2$ increase, and the capacitance C and the capacitance D do not change. Thus, there is no possibility that the sensitivity to touch with a finger or the like decreases.

[Modification 2]

Figure 15:
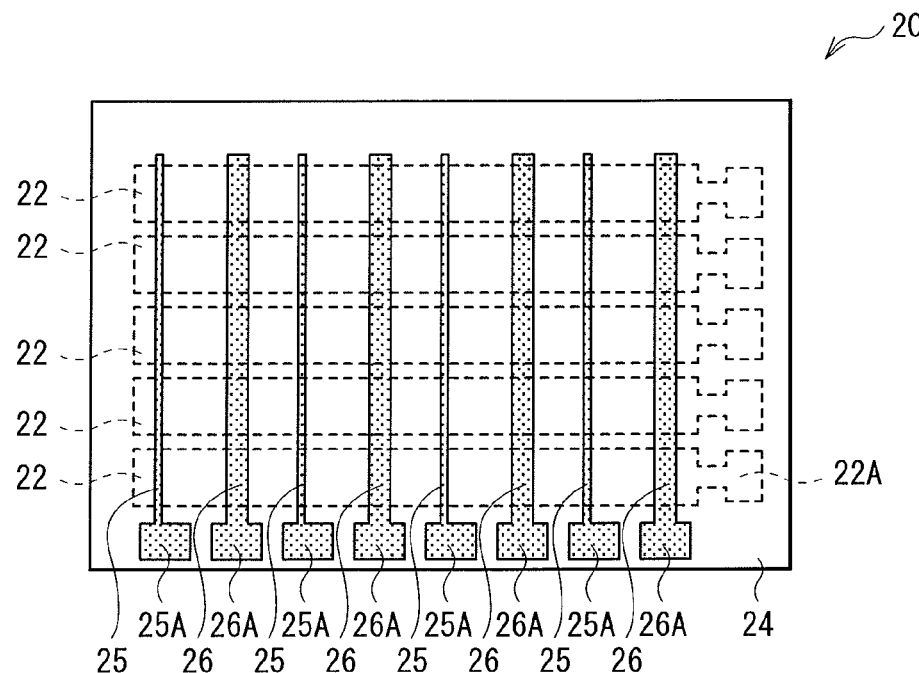
FIG. 15 is a diagram illustrating another example of the top face configuration of the touch panel shown in FIG. 4.

In the foregoing embodiment, the detection electrodes 25 and 26 are formed so that the capacitances C and D become almost equal to each other. However, for example, due to manufacture error or the like, there may be a case that the capacitances C and D are slightly different from each other. For example, in the case where the projection parts 25B of the detection electrode 25 are eliminated and the detection electrode 25 is formed in a rod-like shape as illustrated in FIG. 15, the capacitances C and D are largely different from each other. In the case where there is a difference between the capacitances C and D, the signal level of the external noise included in the detection signal $V_{det}$ obtained from the detection electrode 25 and that of the external noise included in the detection signal $V_{det}$ obtained from the detection electrode 26 become different from each other. Consequently, even if the difference between the detection signal $V_{det}$ obtained from the detection electrode 25 and the detection signal $V_{det}$ obtained from the detection electrode 26 is simply obtained, the external noise is not eliminated from the detection signal $V_{det}$. Therefore, in the present modification, the case where there is a difference between the signal levels of external noises included in the detection signals $V_{det}$ is assumed, and means for correcting the difference is also provided.

Figure 16:
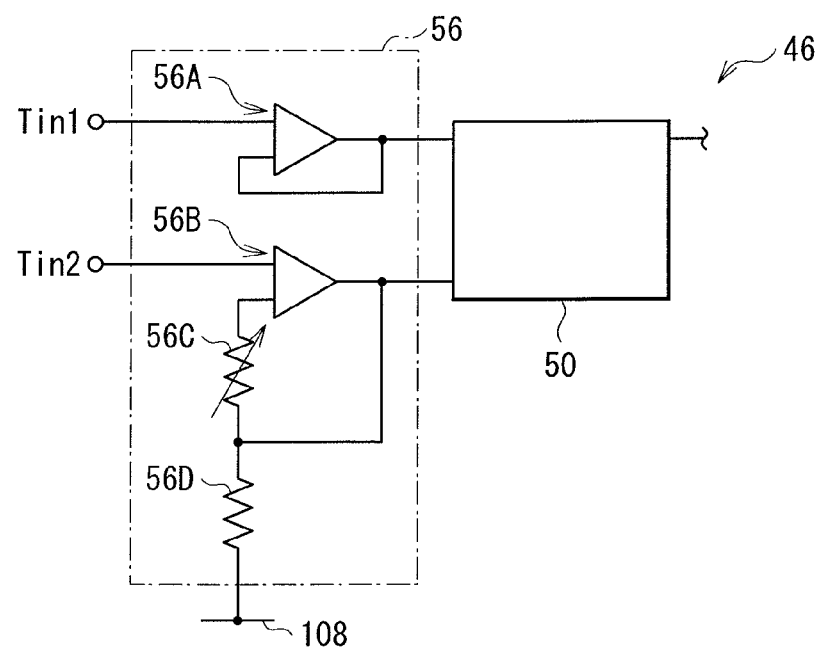
FIG. 16 is a diagram illustrating another example of a schematic configuration of the detection circuit shown in FIG. 4.

For example, in the present modification, as illustrated in FIG. 16, in the detection circuit 46, an output adjustment circuit 56 is provided between the difference circuit 50 and the input terminals $T_{in1}$ and $T_{in2}$. The output adjustment circuit 56 makes the signal level of the detection signal $V_{det}$ input to the input terminal $T_{in1}$ and the signal level of the detection signal $V_{det}$ input to the input terminal $T_{in2}$ equal to each other. Incidentally, it is assumed here that the detection electrode 25 is connected to the input terminal $T_{in1}$ and the detection electrode 26 is connected to the input terminal $T_{in2}$.

Example of Using Operational Amplifier Whose Magnification is Adjustable

The output adjustment circuit 56 has, for example, two operational amplifiers 56A and 56B. The positive input terminal (+) of the operational amplifier 56A is connected to the input terminal $T_{in1}$, and the output terminal of the operational amplifier 56A is connected to one of input terminals of the difference circuit 50. The negative input terminal (−) of the operational amplifier 56A is connected to the output terminal of the operational amplifier 56A, and the operational amplifier 56A serves as a voltage follower. The positive input terminal (+) of the other operational amplifier 56B is connected to the input terminal $T_{in2}$, and the output terminal of the operational amplifier 56B is connected to the other input terminal of the difference circuit 50. The negative input terminal (−) of the operational amplifier 56B is connected to one end of each of a variable resistor 56C and a fixed resistor 56D which are connected in series, and the other end of each of the variable resistor 56C and the fixed resistor 56D which are connected in series are connected to the reference potential line 108. A connection point between the variable resistor 56C and the fixed resistor 56D is connected to the output terminal of the operational amplifier 56B. Therefore, the operation amplifier 56A is a non-inversion amplifier.

The variable resistor 56C in the output adjustment circuit 56 is adjusted, for example, as follows. First, a voltmeter is connected to two outputs of the output adjustment circuit 56. Next, under environment where there is no external noise, in a state where the image display face 1A is touched with a conductor to which a voltage source is connected (for example, a pseudo finger), a predetermined fixed voltage is applied to the scan line WSL2 just below the conductor. Thus, the detection signals $V_{det}$ output from the detection electrodes 25 and 26 are input to the voltmeter via the output adjustment circuit 56, and the voltage level of the input signal is displayed on the voltmeter. Next, the voltage of the conductor is set to a predetermined voltage value by using a voltage source, and the value of the variable resistor 56C is adjusted while seeing display of the voltmeter so that the values of the detection signals $V_{det}$ obtained from the detection electrodes 25 and 26 become equal to each other.

As described above, in the present modification, the signal level of the detection signal $V_{det}$ input to the input terminal $T_{in2}$ is corrected by using the variable resistor 56C whose resistance value is adjusted. After that, the difference between the corrected detection signal and the detection signal $V_{det}$ input to the input terminal $T_{in2}$ is obtained. Thereby, the external noise is eliminated from the detection signal $V_{det}$. Therefore, it is possible to eliminate the erroneous detection caused by the external noise. Incidentally, the correction on the signal level of the detection signal $V_{det}$ may be performed only on the detection signal $V_{det}$ input to the input terminal Tin', or may be performed on both of the detection signals $V_{det}$ input to the input terminals $T_{in1}$ and $T_{in2}$.

Example of Using Arithmetic Circuit

In the above-described modification, the output adjustment circuit 56 is structured by an analog circuit including the operational amplifier whose magnification is adjustable. The output adjustment circuit 56 may be structured by a digital circuit such as a ROM (Read-Only Memory) on which a program for correcting noise level is written. The program written on the digital circuit includes a correction formula for correcting the noise level.

When the signal level of the detection signal $V_{det}$ input to the input terminal $T_{in1}$ is $V_{in1}$, and that of the detection signal $V_{det}$ input to the input terminals $T_{in2}$ is set to $V_{in2}$, the correction formula is expressed, for example, by the following formulae (1) and (2).

$$V_{c1} = \alpha \times V_{in1} \quad (1)$$

$$V_{c1} = V_{in2} \quad (2)$$

In the above formulae, only $V_{in1}$ is corrected. However, for example, as shown in the following formulae (3) and (4), only $V_{in2}$ may be corrected. Also, both of them may be corrected.

$$V_{c1} = V_{in1} \quad (3)$$

$$V_{c1} = (1/\alpha) \times V_{in2} \quad (4)$$

A correction factor α in the correction formulae for correcting the noise level is set, for example, as follows. First, a voltmeter is connected to the detection line DET connected to the detection electrode 25 and the detection line DET connected to the detection electrode 26. Next, under environment where there is no external noise, in a state where the image display face 1A is touched with a conductor to which a voltage source is connected (for example, a pseudo finger), a predetermined fixed voltage is applied to the scan line WSL2 just below the conductor. Thus, the detection signals $V_{det}$ output from the detection electrodes 25 and 26 are input to the voltmeter, and the voltage level of the input signal is displayed on the voltmeter. Next, the voltage of the conductor is set to a predetermined voltage value by using a voltage source, and the indication in the voltmeter at that time is read. After that, a ratio (Vy/(Vx−Vy)) between the voltage value Vx of the detection signal $V_{det}$ output from the detection electrode 25 and the voltage value Vy of the detection signal $V_{det}$ output from the detection electrode 26 is calculated. The ratio is set as the correction factor α.

As described above, in the present modification, the signal level of the detection signal $V_{det}$ input to the input terminal $T_{in2}$ is corrected by using the correction formula in which the value of the correction factor α is set. After that, the difference between the corrected detection signal and the detection signal $V_{det}$ input to the input terminal $T_{in2}$ is obtained. Thereby, the external noise is eliminated from the detection signal $V_{det}$. Therefore, it is possible to eliminate the erroneous detection caused by the external noise. Incidentally, the correction on the signal level of the detection signal $V_{det}$ may be performed only on the detection signal $V_{det}$ input to the input terminal $T_{in1}$, or may be performed on both of the detection signals $V_{det}$ input to the input terminals $T_{in1}$ and $T_{in2}$.

Second Embodiment

Figure 17:
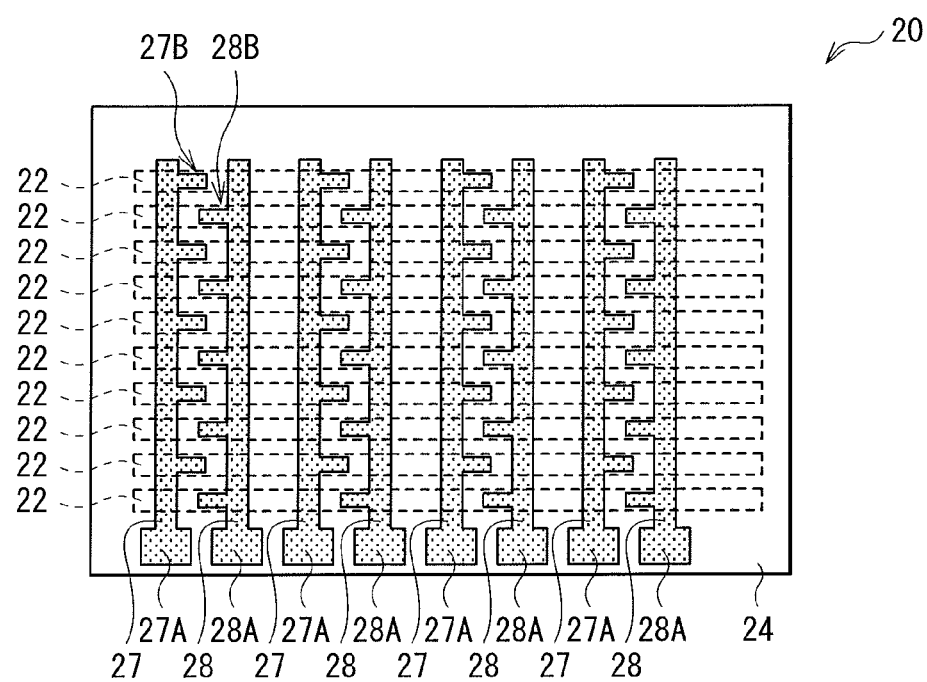
FIG. 17 is a diagram illustrating an example of the top face configuration of a touch panel mounted on a liquid crystal display device according to a second embodiment of the invention.

FIG. 17 illustrates an example of the top face configuration of the touch panel 20 included in a liquid crystal display device according to a second embodiment of the invention. The liquid crystal display device of the second embodiment is different from the liquid crystal display device of the foregoing embodiment, in that a plurality of detection electrodes 27 are provided in place of the plurality of detection electrodes 25, and a plurality of detection electrodes 28 are provided in place of the plurality of detection electrodes 26 in the touch panel 20. In the following, the points different from the configuration of the foregoing embodiment will be mainly described, and description of the configuration common to that of the foregoing embodiment will not be repeated. In the following, the same reference numerals are designated to components common to those described above.

The detection electrode 27 corresponds to the other electrode in the touch sensor of the electrostatic capacitance type, and is electrically connected to the detection line DET. The detection electrode 27 is, for example, formed in contact with the surface of the transparent substrate 24. The plurality of detection electrodes 27 have a band-shape electrode part extending in a direction (for example, the column direction) crossing the extending direction of the scan electrodes 22, and are disposed parallel with each other. The electrode part of the detection electrodes 27 faces any of the scan electrodes 22. As shown in FIG. 17, the detection electrode 27 has a plurality of projection parts 27B coupled to the electrode part. The projection parts 27B are disposed in, for example, a region facing the scan electrodes 22 among the plurality of scan electrodes 22. The projection part 27B protrudes in a direction (for example, the row direction) crossing the extension direction of the electrode part, and has, for example, a rod-like shape as shown in FIG. 17. The detection electrode 27 has, for example, a comb-like shape formed by the electrode part and the plurality of projection parts 27B. The projection part 27B does not always have to have the rod-like shape, but may have another shape. At one end of each detection electrode 27, a connection pad 27A which is to be connected to the peripheral circuit 40 is formed. Preferably, the connection pads 27A are disposed near one common side in the surface of the transparent substrate 24. Where appropriate, the connection pads 27A may be disposed dispersedly near a plurality of sides of the surface of the transparent substrate 24.

The detection electrode 28 also corresponds to the other electrode in the capacitive element, and is electrically connected to the detection line DET. The detection electrode 28 is formed in the same plane as that of the detection electrode 27, and is formed in contact with, for example, the surface of the transparent substrate 24. The plurality of detection electrodes 28 have a band-like shape extending in a direction (for example, the column direction) crossing the extension direction of the scan electrode 22, and are arranged in parallel with each other. The detection electrode 28 faces any of the scan electrodes 22. The detection electrode 28 also has, as illustrated in FIG. 17, a plurality of projections 28B coupled to the electrode part. The projections 28B are disposed in regions facing the scan electrodes 22 which do not face the projections 27B among the plurality of scan electrodes. That is, the projections 27B and 28B are provided in the regions facing the different scan electrodes 22. Therefore, the detection electrode 28 has a shape different from that of the detection electrode 27. For example, in the case where the projections 27B are provided in the regions facing the odd-numbered scan electrodes 22, the projections 28B are provided in the regions facing the even-numbered scan electrodes 22. For example, in the case where the projections 27B are provided in the regions facing the even-numbered scan electrodes 22, the projections 28B are provided in the regions facing the odd-numbered scan electrodes 22.

The projection part 28B protrudes in a direction (for example, the row direction) crossing the extension direction of the electrode part, and has, for example, a rod-like shape as shown in FIG. 17. The detection electrode 28 has, for example, a comb-like shape formed by the electrode part and the plurality of projection parts 28B. In the detection electrode 28, for example, the projection parts 28B are disposed close to the projection parts 27B so that the projection parts 27B of the detection electrode 27 and the projection parts 28B of the detection electrode 28 are disposed alternately in a direction (for example, the column direction) crossing the extension direction of the scan electrodes 22. Preferably, the connection pads 28A are disposed near one common side in the surface of the transparent substrate 24 together with the connection pads 27A. Where appropriate, the connection pads 28A may be disposed dispersedly near a plurality of sides of the surface of the transparent substrate 24.

The line width of the detection electrode 27 may be equal to or different from that of the detection electrode 28. In the case where the line width of the detection electrode 27 is equal to that of the detection electrode 28, a region in which the fringe capacitance $C_2$ is formed in the detection electrode 27 becomes wider than that in the detection electrode 28 by an amount of the length of the edge included in the projection part 27B on the scan electrode 22 facing the projection part 27B. In this case, when the scan electrode 22 facing the projection part 27B is driven, the sensitivity to contact of a finger or the like of the detection electrode 27 is higher than that of the detection electrode 28. When the line width of the detection electrode 27 is different from that of the detection electrode 28, the region in which the fringe capacitance $C_2$ is formed in any of the detection electrodes 27 and 28 becomes wider by an amount of the difference between the length of the edge in the detection electrode 27 included on the scan electrode 22 facing the projection part 28B and the length of the edge in the detection electrode 28 included on the scan electrode 22 facing the projection part 28B. In this case, when the scan electrode 22 facing the projection part 28B is driven, the sensitivity to contact of a finger or the like of the detection electrode 27 or 28 having the wider region in which the fringe capacitance $C_2$ is formed becomes higher. That is, in the present embodiment, the sensitivity to contact of a finger or the like, of the detection electrodes 27 and 28 varies depending on the scan electrode 22.

Also, in the present embodiment, the detection electrodes 27 and 28 are disposed so that at least one detection electrode 27 and one detection electrode 28 are provided just below a contact part between the object such as a finger or pen and the image display face 1A when the object touches the image display face 1A. That is, the detection electrodes 27 and 28 are disposed so that the gap between the neighboring detection electrodes 27 and 28 becomes smaller than the diameter of the contact part. Further, the detection electrodes 27 and 28 are formed so that, for example, when the image display surface 1A is touched with the object such as a finger or pen, capacitance (capacitance C) formed between the detection electrode 27 and the object, and capacitance (capacitance D) formed between the detection electrode 28 and the object, are almost equal to each other. In the present embodiment, for example, when the detection electrodes 27 and 28 are disposed alternately in the row direction as shown in FIG. 17, the capacitances C and D are almost equal to each other. Also, in the present embodiment, for example, when the projection parts 28B are disposed close to the projection part 27B so that the projection parts 27B and 28B are alternatively disposed in a direction (for example, the column direction) crossing the extension direction of the scan electrode 22 as illustrated in FIG. 17, the capacitances C and D are almost equal to each other. Further, in the present embodiment, for example, as shown in FIG. 17, also in the case where the area of the part facing one scan electrode 22 in the detection electrode 27 and that of the part facing one scan electrode 22 in the detection electrode 28 are equal to each other, the capacitances C and D are substantially equal to each other.

Consequently, for example, the sensitivity to the external noise in the detection electrode 27 and that in the detection electrode 28 is almost equalized when the user becoming as an antenna and catching the external noise touches the panel with his/her finger and the external noise is transmitted to the touch panel 20 via the finger. In the case where the sensitivity to the external noise of the detection electrode 27 and the sensitivity to the external noise of the detection electrode 28 are equal to each other, the signal level of the external noise included in the detection signal $V_{det}$ obtained from the detection electrode 27 and that of the external noise included in the detection signal $V_{det}$ obtained from the detection electrode 28 are equal to each other. Therefore, for example, by calculating the difference between the detection signal $V_{det}$ obtained from the detection electrode 27 and that obtained from the detection electrode 28, it is possible to eliminate the external noise from the detection signals.

Figure 18:
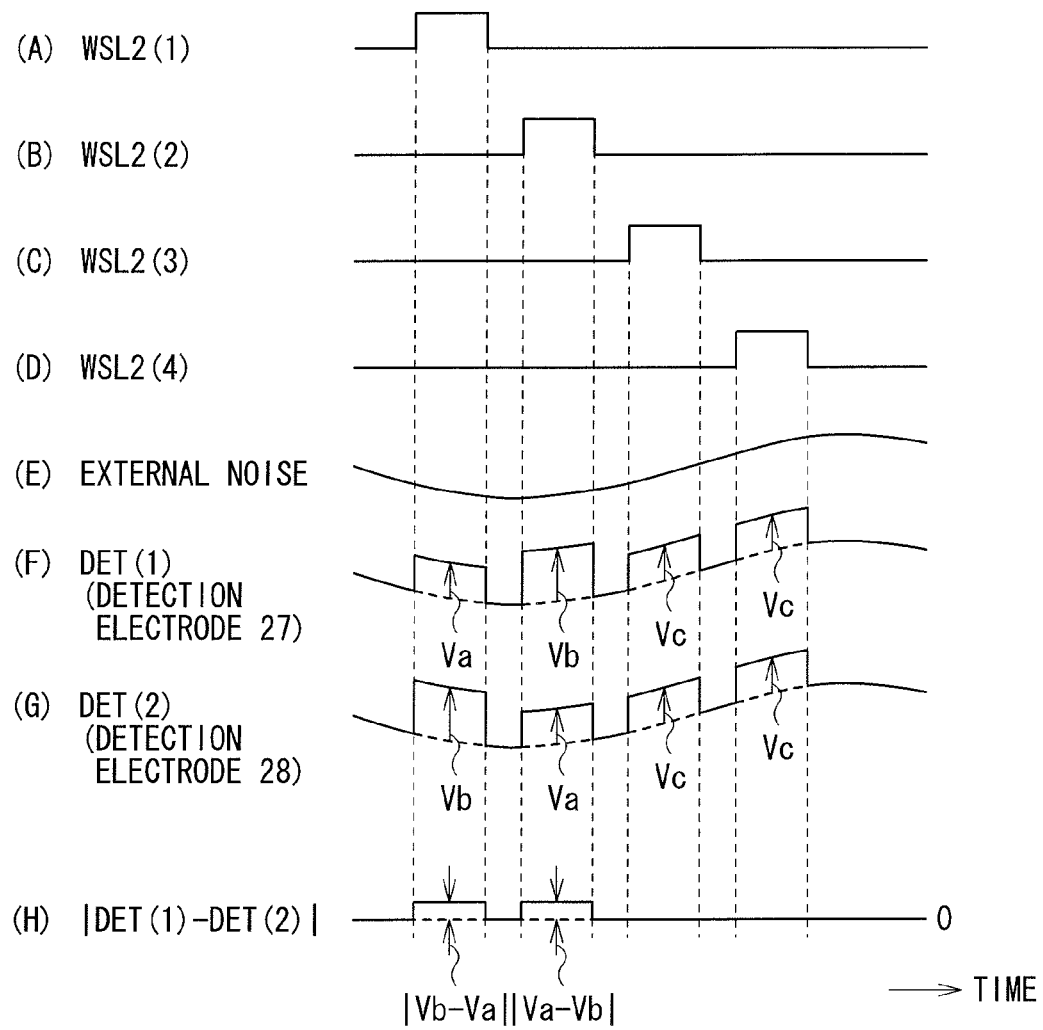
FIG. 18 is a diagram illustrating an example of waveforms of signals in the touch panel of FIG. 17.

Part (A) to Part (H) of FIG. 18 illustrate an example of signal waveforms when the detection electrodes 27 and 28 have the configuration illustrated in FIG. 17, and when, in a state where the touch panel 20 is touched with a finger, the plurality of scan lines WSL2 are sequentially driven. In Parts (A) to (D) of FIG. 18, the number at the end of each of WSL2(1), WSL2(2), WSL2(3), and WSL2(4) indicates serial number (sequence number) of the scan line WSL2. The number at the end of each of DET(1) and DET(2) in Parts (F) and (G) of FIG. 18 indicates serial number (sequence number) of the detection lines DET. In Parts (F) to (H) of FIG. 18, DET(1) corresponds to the detection line DET connected to the detection electrode 27, and DET(2) corresponds to the detection line DET connected to the detection electrode 28. Parts (F) to (H) of FIG. 18F illustrate signal waveforms obtained when a finger touches the region opposing the crossing part of the first and second third scan lines WSL2 and the first and second detection lines DET.

It can be seen from Part (F) of FIG. 18 that, when the first scan line WSL2 is selected, the detection signal $V_{det}$ of the voltage Va is obtained from the first selection line DET, and the detection signal $V_{det}$ of a voltage Vb (>Va) is obtained from the second selection line DET. It can be seen from Part (G) of FIG. 18 that, when the second scan line WSL2 is selected, the detection signal $V_{det}$ of the voltage Vb is obtained from the first selection line DET, and the detection signal $V_{det}$ of the voltage Va is obtained from the second selection line DET. The reason why the signal level of the detection signal $V_{det}$ varies between the first selection line DET and the second selection line DET is that the sensitivity to touch with a finger or the like in the detection electrode 27 connected to the first selection line DET and that in the detection electrode 28 connected to the second selection line DET are different from each other.

It can also be seen from Parts (F) and (G) of FIG. 18 that, when the third and fourth scan lines WSL2 are selected, the detection signal $V_{det}$ of the voltage Vc is obtained from the selection line DET(1), and the detection signal $V_{det}$ of a voltage Vd (=Vc) is obtained from the selection line DET (2). The reason why the signal level of the detection signal $V_{det}$ of the first selection line DET and that of the second selection line DET are the same is that a finger does not touch the part just above the third and fourth scan lines WSL2, and the detection electrodes 27 and 28 are hardly influenced by the finger.

It can also be seen from Parts (E) to (G) of FIG. 18 that noise having the same phase as that of the external noise is included at almost the same level in the detection signal $V_{det}$ obtained from the first selection line DET and the detection signal $V_{det}$ obtained from the second selection line DET. The reason is that the sensitivity to the external noise in the detection electrode 27 connected to the first selection line DET and that in the detection electrode 28 connected to the second selection line DET are almost equal to each other.

It can be seen from Part (H) of FIG. 18 that, by obtaining the difference (the absolute value of the difference) between the detection signal $V_{det}$ obtained from DET(1) and the detection signal $V_{det}$ obtained from DET(2), a fluctuation component |Vb−Va| of the detection signal $V_{det}$ by touch of a finger is extracted. It can also be seen from Part (H) of FIG. 18 that the noise having the same phase as that of the external noise is eliminated from the detection signal $V_{det}$.

From the above, by providing the two kinds of the detection electrodes 27 and 28 having the different sensitivities to the contact/non-contact state and having the almost equal sensitivities to the external noise, the external noise is eliminated from the detection signal $V_{det}$ only by calculating the difference of the detection signals $V_{det}$. Therefore, it is possible to eliminate the erroneous detection caused by the external noise.

Modification of Second Embodiment

[Modification 1]

Although the case where one scan electrode 22 is connected to one scan line WSL2 has been described in the foregoing embodiment, the plurality of neighboring scan electrodes 22 may be connected to one scan line WSL2. In such a case, as compared with the case where one scan electrode 22 is connected to one scan line WSL2, the signal level of the detection signal $V_{det}$ obtained from the detection electrodes 27 and 28 is made higher.

[Modification 2]

In the foregoing embodiment, the detection electrodes 27 and 28 are formed so that the capacitances C and D become almost equal to each other. However, for example, due to manufacture error or the like, there may be a case that the capacitances C and D are slightly different from each other. On the assumption of such a case, for example, the output adjustment circuit 56 as shown in FIG. 16 may be further provided as means for ensuring that the erroneous detection caused by the external noise is eliminated. With this configuration, the external noise is eliminated from the detection signal $V_{det}$ only by calculating the difference between two signals output from the output adjustment circuit 56. As a result, it is possible to eliminate the erroneous detection caused by the external noise.

Third Embodiment

Figure 19:
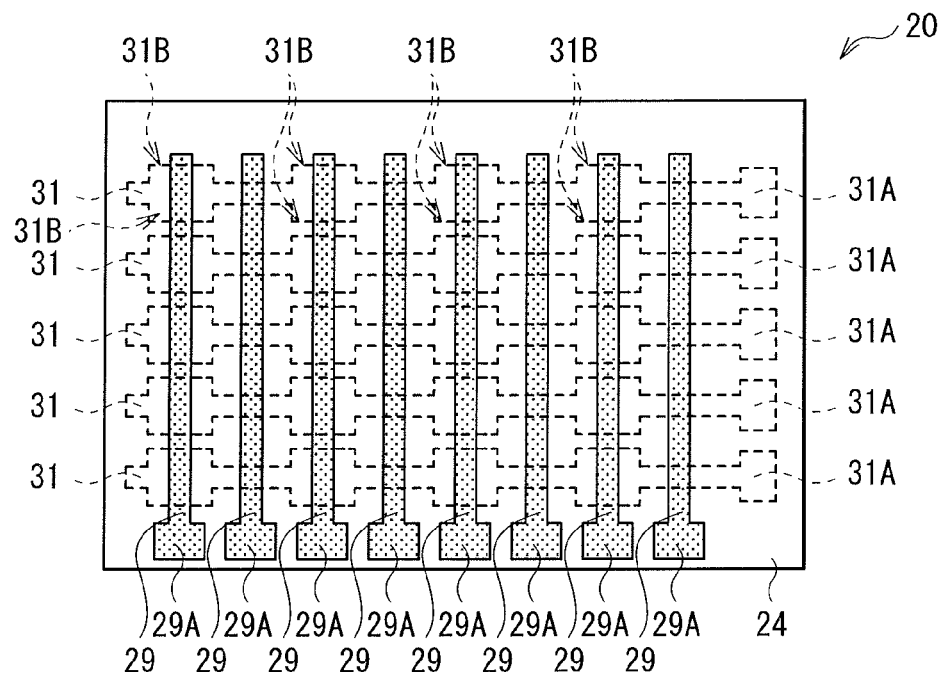
FIG. 19 is a diagram illustrating an example of the top face configuration of a touch panel mounted on a liquid crystal display device according to a third embodiment of the invention.

FIG. 19 illustrates an example of the top face configuration of the touch panel 20 included in a liquid crystal display device according to a third embodiment of the invention. The liquid crystal display device of the third embodiment is different from the liquid crystal display device 1 of the foregoing embodiment, in that a plurality of detection electrodes 29 are provided in place of the plurality of detection electrodes 25 and 26, and a plurality of detection electrodes 31 are provided in place of the plurality of detection electrodes 22 in the touch panel 20. In the following, the points different from the configuration of the foregoing embodiment will be mainly described, and description of the configuration common to that of the foregoing embodiment will not be repeated.

In the present embodiment, as one of electrodes in the touch sensor of the electrostatic capacitance type, only one kind of the detection electrode 29 is provided. That is, different from the first and second embodiments, the plurality of detection electrodes 29 having the same shape are provided as one of electrodes in the touch sensor. The detection electrode 29 is formed, for example, in contact with the surface of the transparent substrate 24, and is electrically connected to the detection line DET. The plurality of detection electrodes 29 have a band-shape electrode part extending in a direction (for example, the column direction) crossing the extending direction of the scan electrodes 31 which will be described later, and are disposed parallel with each other. The detection electrode 29 faces any of the scan electrodes 31. The detection electrode 29 is not provided with the structure which protrudes in the extending direction of the scan electrode 31 which will be described later. The detection electrode 29 has, for example, a rod-like shape. At one end of each detection electrode 29, a connection pad 29A which is to be connected to the peripheral circuit 40 is formed. Preferably, the connection pads 29A are disposed near one common side in the surface of the transparent substrate 24. Where appropriate, the connection pads 29A may be disposed dispersedly near a plurality of sides of the surface of the transparent substrate 24. The line widths of the detection electrodes 29 are, for example, equal to each other.

Also, in the present embodiment, the detection electrode 29 is disposed so that at least one detection electrode 29 is provided just below a contact part between an object such as a finger or pen and the image display face 1A when the object touches the image display face 1A. That is, the detection electrodes 29 are disposed so that the gap between the neighboring detection electrodes 29 becomes smaller than the diameter of the contact part. Further, the detection electrodes 29 are formed so that, for example, when the image display surface 1A is touched with the object such as a finger or pen, capacitances formed between the detection electrodes 29 and the object are almost equal to each other. In the present embodiment, for example, when the detection electrodes 29 have the same line width as shown in FIG. 19, the capacitances formed between the detection electrodes 29 and the object are almost equal to each other.

The scan electrode 31 corresponds to the other electrode in the electrostatic capacitance type touch sensor, and is electrically connected to the scan line WSL2. The scan electrode 31 is formed, for example, in contact with the surface of the transparent substrate 21. The plurality of scan electrodes 31 have, for example, a band-shaped electrode part extending in the row direction, and are disposed in parallel with each other. The electrode parts of the scan electrodes 31 extend, for example, in a direction parallel with the common electrode 113 in the liquid crystal display panel 10. At one end of each scan electrode 31, the connection pad 31A to be connected to the peripheral circuit 40 is formed.

For example, as illustrated in FIG. 19, the scan electrode 31 is provided with a plurality of projection parts 31B. The projection parts 31B are provided in a region facing the predetermined detection electrodes 29 among the plurality of detection electrodes 29, and protrude in the extension direction of the detection electrodes 29. For example, the projection parts 31B are provided in the region facing the odd-numbered detection electrodes 29 among the plurality of detection electrodes 29 disposed in parallel, or provided in the region facing the even-numbered detection electrodes 29 among the plurality of detection electrodes 29 disposed in parallel. That is, the projection parts 31B do not face the predetermined detection electrodes in the plurality of detection electrodes 29, and only the electrode parts of the scan electrodes 31 face. The scan electrode 31 is thick in the portion where the projection part 31B is provided, and is narrow in the portion where the projection part 31B is not provided. That is, the shape of the scan electrode 31 varies depending on the places (portions in the scan electrode 31).

In the portion where the scan electrode 31 is thick, the edge included in the part facing to overlap the scan electrode 31 in the detection electrode 29 is long. Consequently, in the detection electrode 29 facing the projection part 31B in the plurality of detection electrodes 29, the rate of the fringe capacitance $C_2$ in the total capacitance is high. On the other hand, in the narrow portion in the scan electrode 31, the edge included in the portion facing to overlap the scan electrode 31 in the detection electrode 29 is short. Therefore, in the detection electrode 29 which does not face the projection part 31B in the plurality of detection electrodes 29, the rate of the fringe capacitance $C_2$ in the total capacitance is low.

As described above, in the present embodiment, the sensitivity to touch of a finger or the like in the detection electrode 29 facing the projection part 31B in the plurality of detection electrodes 29 is higher than that in the detection electrode 29 which does not face the projection part 31B in the plurality of detection electrodes 29. In other words, in the present embodiment, the detection electrodes 29 having the mutually-different sensitivities to touch of a finger or the like are provided for the touch panel 20.

Consequently, for example, when the user serves as an antenna and catches external noise, and the user touches the panel with a finger and the external noise is thus transmitted to the touch panel 20 via the finger, the sensitivities to the external noise in the detection electrodes 29 are almost equalized. In the case where the sensitivities to the external noise in the detection electrodes 29 are equal to each other, the signal levels of the external noises included in the detection signals $V_{det}$ obtained from the detection electrodes 29 become equal to each other. Therefore, for example, by obtaining the difference between the detection signal $V_{det}$ obtained from the detection electrode 29 facing the projection part 31B among the plurality of detection electrodes 29 and the detection signal $V_{det}$ obtained from the detection electrode 29 which does not face the projection part 31B among the plurality of detection electrodes 29, the external noise is eliminated from the detection signal.

From the above, in the present embodiment, by providing the two kinds of the detection electrodes 29 having the different sensitivities to the contact/non-contact state and having the almost equal sensitivities to the external noise, the external noise is eliminated from the detection signal $V_{det}$ only by calculating the difference of the detection signals $V_{det}$. Therefore, it is possible to eliminate the erroneous detection caused by the external noise.

Fourth Embodiment

Figure 20:
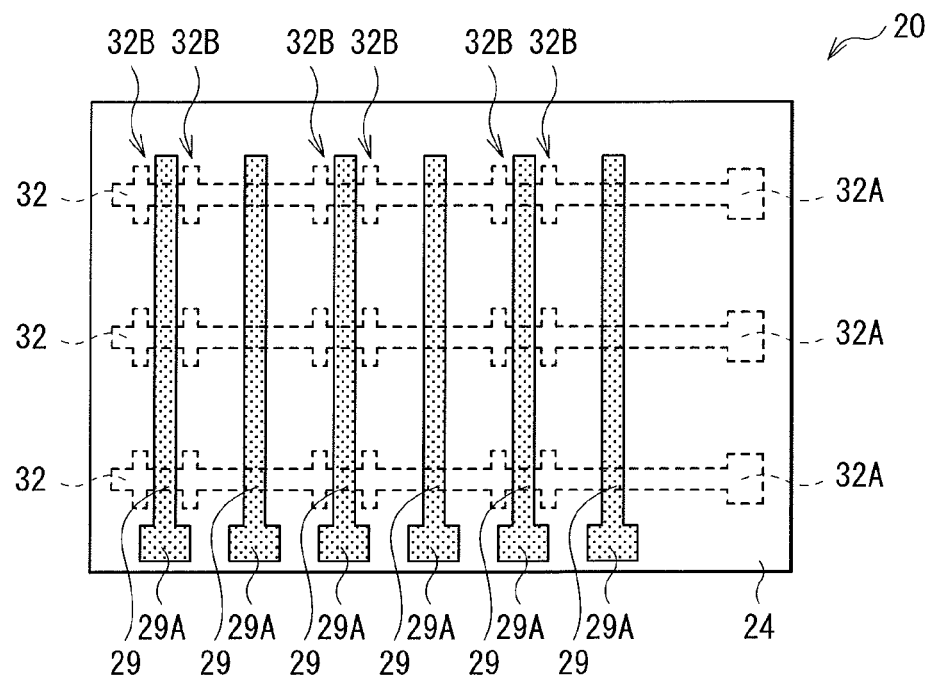
FIG. 20 is a diagram illustrating an example of the top face configuration of a touch panel mounted on a liquid crystal display device according to a fourth embodiment of the invention.

FIG. 20 illustrates an example of the top face configuration of the touch panel 20 included in a liquid crystal display device according to a fourth embodiment of the invention. The liquid crystal display device of the fourth embodiment is different from the liquid crystal display device of the third embodiment, in that a plurality of scan electrodes 32 are provided in place of the plurality of detection electrodes 31 in the touch panel 20 of the third embodiment. In the following, the points different from the configuration of the foregoing embodiment will be mainly described, and description of the configuration common to that of the foregoing embodiment will not be repeated.

The scan electrode 32 corresponds to one of electrodes in the touch sensor of the electrostatic capacitance type, and is electrically connected to the scan line WSL2. The scan electrode 32 is formed, for example, in contact with the surface of the transparent substrate 21. The plurality of scan electrodes 32 have, for example, a band-shape electrode part extending in the row direction, and are disposed parallel with each other. The electrode parts of the scan electrodes 32 extend in a direction parallel with the common electrodes 113 in the liquid crystal display panel 10. At one end of each scan electrode 32, a connection pad 32A which is to be connected to the peripheral circuit 40 is formed.

For example, as illustrated in FIG. 20, the scan electrode 32 is provided with a plurality of projection parts 32B. The plurality of projection parts 32B are provided so as to sandwich regions facing predetermined detection electrodes 29 among the plurality of detection electrodes 29 from the row direction, and extend in the extension direction of the detection electrodes 29. The projection parts 32B are provided in a region facing the odd-numbered detection electrodes 29 among the plurality of detection electrodes 29 disposed side-by-side, or in a region facing the even-numbered detection electrodes 29 among the plurality of detection electrodes 29 disposed side-by-side. That is, the detection electrodes 29 do not face the projection parts 31B, but face only the electrode parts of the scan electrodes 32. The scan electrode 32 is thick in the portion where the projection part 32B is provided, and is narrow in the portion where the projection part 32B is not provided.

To the detection electrode 29 sandwiched by the projection parts 32B among the plurality of detection electrodes 29, as compared with the detection electrode 29 which is not sandwiched by the projection parts 32B among the plurality of detection electrodes 29, the larger number of edges of the projection parts 32 are adjacent. Consequently, in the detection electrode 29 sandwiched by the projection parts 32B among the plurality of detection electrodes 29, the rate of the fringe capacitance $C_2$ in the total capacitance is high. On the other hand, in the detection electrode 29 which is not sandwiched by the projection parts 32B among the plurality of detection electrodes 29, the rate of the fringe capacitance $C_2$ in the total capacitance is low.

As described above, in the present embodiment, the sensitivity to touch of a finger or the like in the detection electrode 29 which is sandwiched by the projection parts 32B among the plurality of detection electrodes 29 is higher than that in the detection electrode 29 which is not sandwiched by the projection parts 32B among the plurality of detection electrodes 29. In other words, in the present embodiment, the detection electrodes 29 having the mutually-different sensitivities to touch of a finger or the like are provided for the touch panel 20.

Consequently, for example, when the user serves as an antenna and catches the external noise, and the user touches the panel with a finger and the external noise is transmitted to the touch panel 20 via the finger, the sensitivities to the external noise in the detection electrodes 29 are almost equalized. In the case where the sensitivities to the external noise in the detection electrodes 29 are equal to each other, the signal levels of the external noises included in the detection signals $V_{det}$ obtained from the detection electrodes 29 become equal to each other. Therefore, for example, by obtaining the difference between the detection signal $V_{det}$ obtained from the detection electrode 29 sandwiched by the projection parts 32B among the plurality of detection electrodes 29 and the detection signal $V_{det}$ obtained from the detection electrode 29 which is not sandwiched by the projection parts 32B among the plurality of detection electrodes 29, the external noise is eliminated from the detection signals.

From the above, in the present embodiment, by providing the two kinds of the detection electrodes 29 having the different sensitivities to the contact/non-contact state and having the almost equal sensitivities to the external noise, the external noise is eliminated from the detection signal $V_{det}$ only by calculating the difference of the detection signals $V_{det}$. Therefore, it is possible to eliminate the erroneous detection caused by the external noise.

Fifth Embodiment

Figure 21:
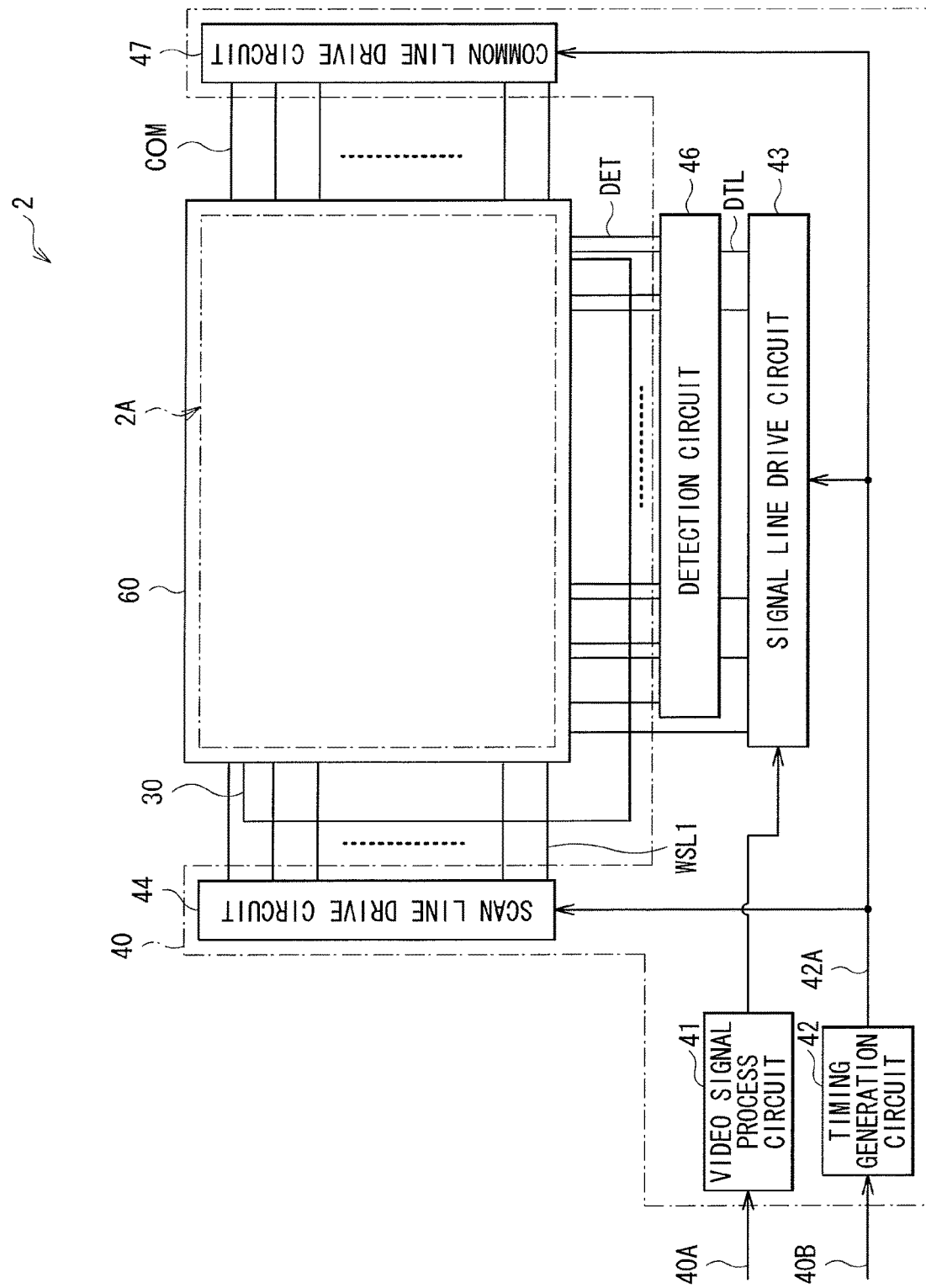
FIG. 21 is a diagram illustrating a schematic configuration of a liquid crystal display device according to a fifth embodiment of the invention.

Next, a liquid crystal display device 2 according to a fifth embodiment of the invention will be described. The liquid crystal display device 2 according to the present embodiment is, as in the first embodiment, a liquid crystal display device with a touch sensor. The liquid crystal display device 2 has, as a display element, a liquid crystal display element, and further includes a touch sensor of an electrostatic capacitance type on the inside of the liquid crystal display element. That is, the liquid crystal display device 2 has a liquid crystal display element of a touch sensor built-in type (in-cell type). The liquid crystal display device 2 has, for example, as illustrated in FIG. 21, a liquid crystal display panel 60, a backlight 30, and a peripheral circuit 40.

[Liquid Crystal Display Panel 60]

The liquid crystal display panel 60 displays a video image by transmitting or modulating light from the light source (backlight 30) by changing arrangement of liquid crystal molecules. The liquid crystal display panel 60 is, for example, a transmission-type display panel in which a plurality of pixels 11 disposed in matrix are driven in accordance with the video signal 40A. As in the forgoing embodiments, for example, as shown in FIG. 5, the liquid crystal display panel 60 has a plurality of scan lines WSL1 disposed as rows, and a plurality of signal lines DTL disposed as columns. The plurality of pixels 11 are disposed in matrix in correspondence with intersections between the scan lines WSL1 and the signal lines DTL. In the liquid crystal display panel 60, further, for example, a plurality of common connection lines COM are disposed as rows. Each common connection line COM is disposed, for example, for the pixels 11 in each row, and is connected to a scan line drive circuit (common line drive circuit) 47 which will be described later.

Figure 22:
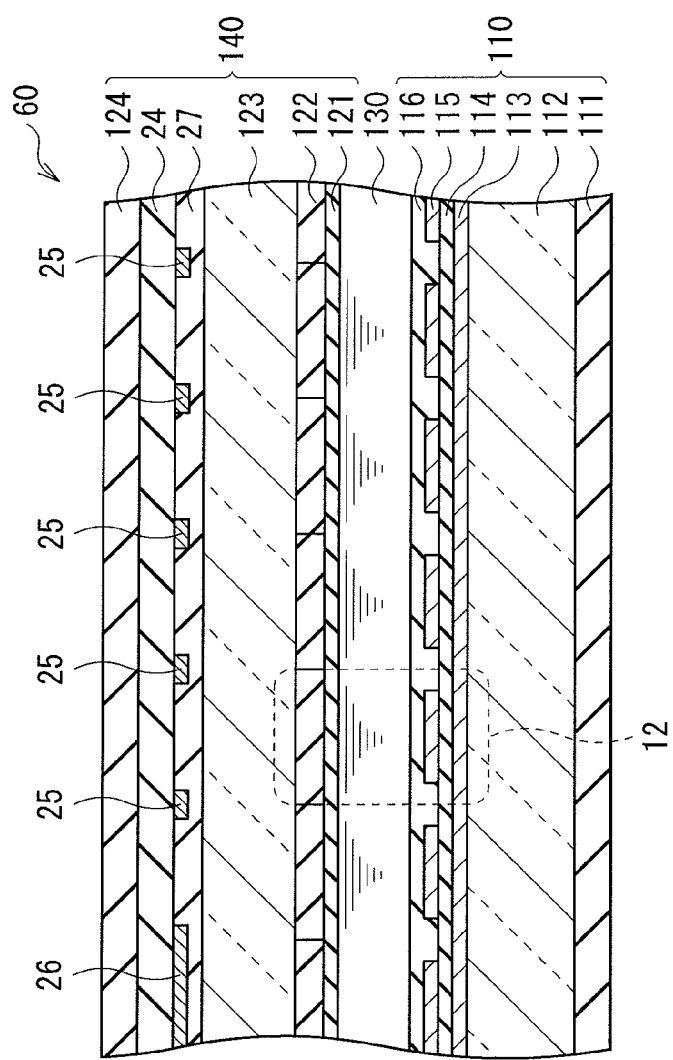
FIG. 22 is a diagram illustrating an example of a schematic configuration of pixels in a liquid crystal display panel shown in FIG. 21.

The liquid crystal display panel 60 has, for example, as shown in FIG. 22, a liquid crystal layer 130 (display function layer), and a light-incidence-side substrate 110 and a light-outgoing-side substrate 120 which are disposed opposing to each other while sandwiching the liquid crystal layer 130. The light-incidence-side substrate 110 is a transparent substrate disposed on the incident side (backlight 30 side) of light from the backlight 30 in the liquid crystal display panel 60. The internal configuration of the light-incidence-side substrate 110 is similar to that in the foregoing embodiments. On the other hand, the light-outgoing-side substrate 140 is a transparent substrate disposed on the outgoing side (observer side) of light modulated by the liquid crystal layer 130 in the liquid crystal display panel 60. The light-outgoing-side substrate 120 has, for example, in order from the liquid crystal layer 130 side, an alignment film 121, a color filter 122, a transparent substrate 123, an adhesion layer 125, detection electrodes 25 and 25, a transparent substrate 24, and a polarizer 124.

Figure 23:
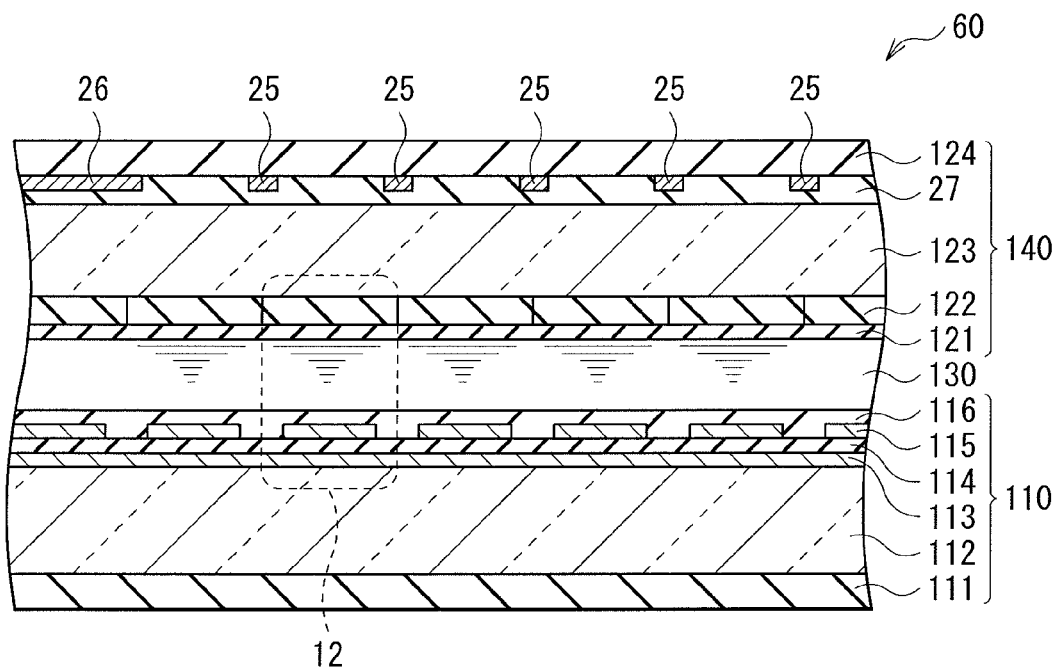
FIG. 23 is a diagram illustrating another example of a sectional configuration of the liquid crystal display panel shown in FIG. 21.
Figure 24:
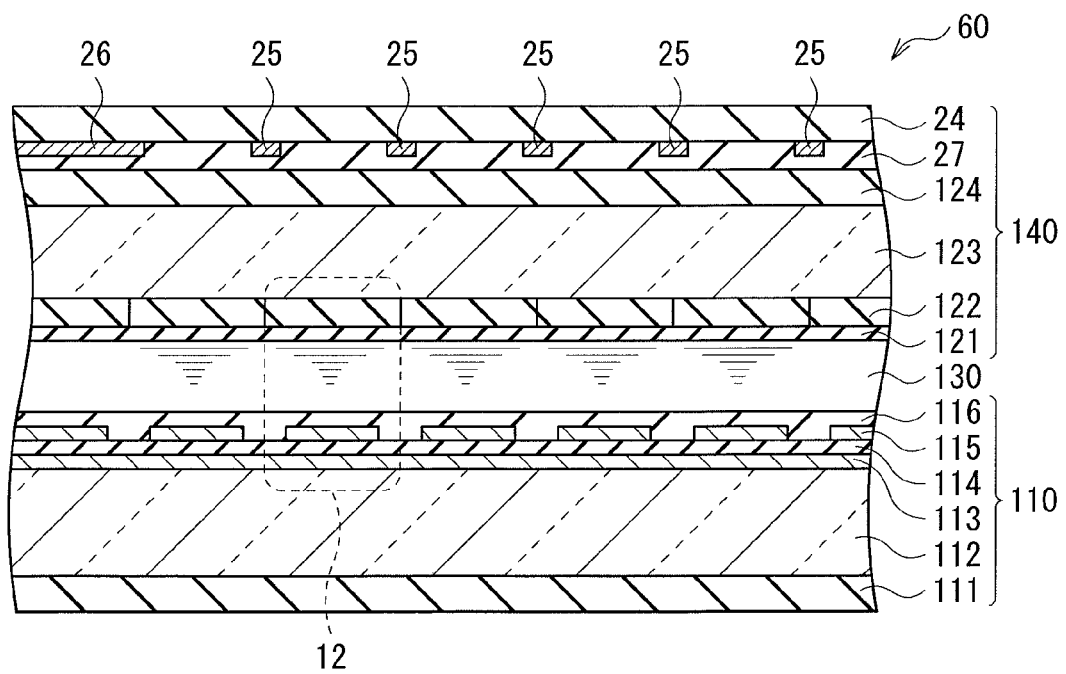
FIG. 24 is a diagram illustrating another example of a sectional configuration of the liquid crystal display panel shown in FIG. 21.

The color filter 122 may not be provided where appropriate. Also, as shown in FIG. 23, the transparent substrate 24 may not be provided where appropriate. As shown in FIG. 24, a stacked body including, in order from the side of the liquid crystal layer 130, the adhesive layer 125, the detection electrodes 25 and 26, and the transparent substrate 24 may be provided on the top face (observer side) of the polarizer 124. In any of the cases illustrated in FIGS. 22, 23, and 24, the detection electrodes 25 and 26 are not exposed from the top face of the liquid crystal display panel 60.

For example, as shown in FIGS. 22, 23, and 24, the liquid crystal display panel 60 has a common electrode 113 as one of electrodes of the touch sensor of the electrostatic capacitance type, and does not have the scan electrode 22 in the first embodiment. As in the first embodiment, the liquid crystal display panel 60 has the detection electrode 25 as the other electrode of the touch sensor of the electrostatic capacitance type. Further, for example, as illustrated in FIG. 22, the liquid crystal display panel 60 has, as a dielectric of the touch sensor of the electrostatic capacitance type, an insulating layer 114, an alignment film 116, the liquid crystal layer 130, the alignment film 121, the color filter 122, the transparent substrate 123, and the adhesive layer 125. In the case where the liquid crystal display panel 60 has, for example, the configuration illustrated in FIG. 24, the dielectric sandwiched by a pair of electrodes in the touch sensor of the electrostatic capacitance type has a configuration obtained by adding the polarizer 124 to the above-described configuration.

In the present embodiment, the common electrode 113 also serves as the scan electrode 22 of the foregoing embodiments, and is electrically connected to the common connection line COM. For example, the common electrode 113 is formed in contact with the surface of the transparent substrate 112. The plurality of common electrodes 113 have, for example, a band-like shape extending in the row direction, and are disposed in parallel with each other. At one end of each common electrode 113, the connection pad 113A to be connected to the peripheral circuit 40 is formed (refer to FIG. 25).

Figure 25:
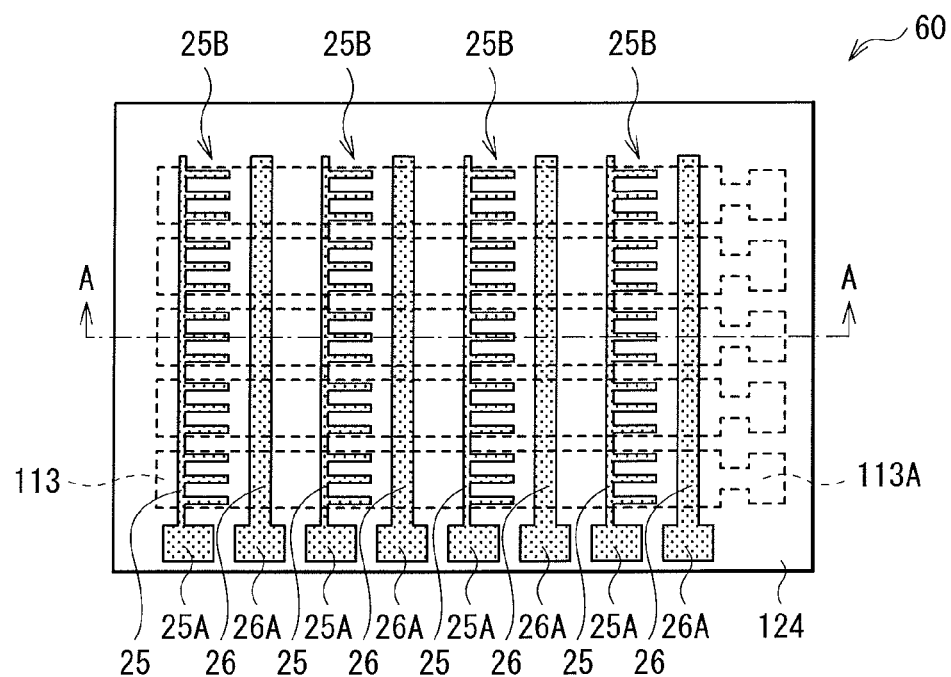
FIG. 25 is a diagram illustrating an example of the top face configuration of the liquid crystal display panel shown in FIG. 21.
Figure 26:
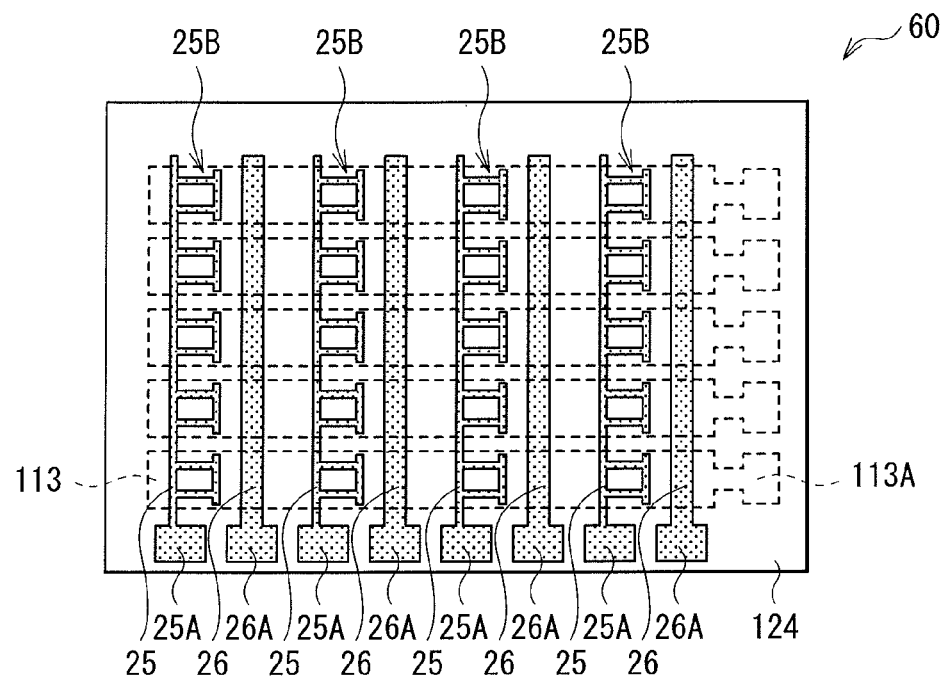
FIG. 26 is a diagram illustrating another example of the top face configuration of the liquid crystal display panel shown in FIG. 21.
Figure 27:
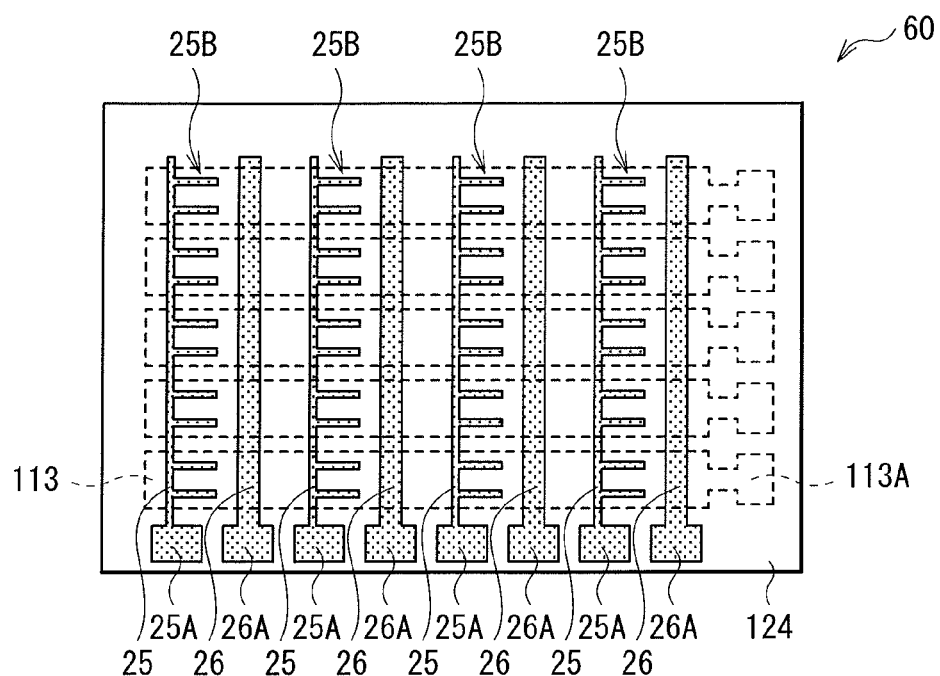
FIG. 27 is a diagram illustrating another example of the top face configuration of the liquid crystal display panel shown in FIG. 21.

The detection electrodes 25 and 26 have configurations similar to those of the foregoing embodiments. That is, the shapes of the detection electrodes 25 and 26 are different from each other. For example, the projection part 25B does not always have to have a rod-like shape as shown in FIG. 25, but may have an annular shape as shown in FIG. 26. Also, three projection parts 25B may be provided in each region facing the scan electrode (common electrode) 113 as shown in FIG. 25, or two projection parts 25B may be provided in each region facing the scan electrode (common electrode) 113 as shown in FIG. 27.

[Peripheral Circuit 40]

In the present embodiment, the peripheral circuit 40 has the scan line drive circuit (common line drive circuit) 47 in place of the scan line drive circuit 45. The scan line drive circuit 47 sequentially applies a selection pulse to the plurality of common connection lines COM according to (synchronously with) input of the control signal 42A to sequentially select the plurality of common electrodes 113 on the basis of the common connection line COM. At the time of selecting the common electrode 113, the scan line drive circuit 47 performs inversion driving of inverting a polarity of a voltage to be supplied to the common connection line COM at every predetermined cycle. For example, when the signal line drive circuit 45 performs 1H inversion driving, the scan line drive circuit 47 applies a potential, whose polarity relative to a reference potential becomes opposite to the polarity relative to the reference potential, of the signal line DTL to the common connection line COM corresponding to the selected pixels 11 selected by the scan line drive circuit 44.

[Operation]

An example of the operation of the liquid crystal display device 2 according to the present embodiment will now be described.

In the liquid crystal display device 2, the signal potential corresponding to the video signal 40A is applied to the signal lines DTL by the signal line drive circuit 43, and the selection pulse according to the control signal 42A is sequentially applied to the plurality of scan lines WSL1 by the scan line drive circuit 44. Consequently, a transverse electric field having a magnitude corresponding to the signal potential is applied on the pixel 11 unit basis to the liquid crystal layer 130, and the liquid crystal molecules are aligned in a predetermined direction. Therefore, the light from the backlight 30 is modulated on the pixel 11 unit basis in the liquid crystal layer 130 in accordance with the alignment direction of the liquid crystal molecules. As a result, an image is displayed on the image display face 2A.

In the liquid crystal display device 2, further, the selection pulse is sequentially applied to the plurality of common connection lines COM by the scan line drive circuit 47. Thus, capacitive elements (capacitive elements corresponding to the capacitive elements 104) each formed in the intersection part of the common electrode 113 and the detection electrode 25 are sequentially changed/discharged, and a detection signal $V_{det}$ of a level based on the capacitance value of the capacitive element is output from each of the plurality of detection electrodes 25. The outputs (detection signals $V_{det}$) from the plurality of detection electrodes 25 are input to the detection circuit 46. In a state where a finger of the user is not in contact with the surface of the touch panel 60, the level of the detection signal $V_{det}$ is almost constant.

When a finger of the user touches any place in the surface of the touch panel 60, a capacitive element formed by an object such as the finger (a capacitive element corresponding to the capacitive element 109) is added to the capacitive element formed in the position where the finger or the like is touched.

Consequently, a value of the detection signal $V_{det}$ output from the detection electrode 25 when the selection pulse is applied to the common electrode 113 corresponding to the touch position becomes smaller than a value of the detection signal $V_{det}$ output when the selection pulse is applied to another place. In the detection circuit 46, the detection signal $V_{det}$ is compared with a threshold voltage $V_{th}$. For example, when the detection signal $V_{det}$ is equal to or less than the threshold voltage $V_{th}$, it is determined that the finger of the user or the like is in contact with the surface of the touch panel 60. The contact position is determined from the application timing of the selection pulse and the detection timing of the detection signal $V_{det}$ which is equal to or less than the threshold voltage $V_th$ in the detection circuit 46.

[Effects]

Next, the effects of the liquid crystal display device 2 according to the present embodiment will be described.

Figure 28:
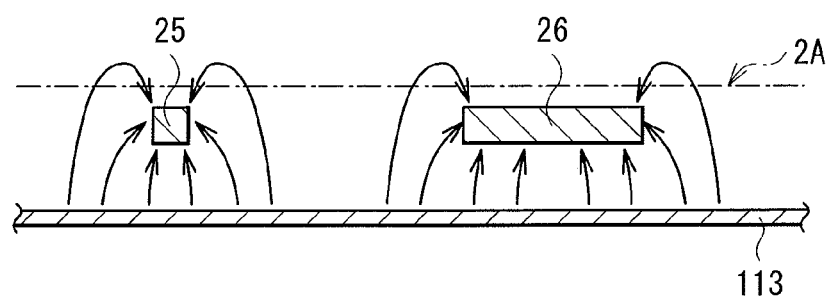
FIG. 28 is a conceptual diagram for explaining fringe capacitance in the liquid crystal display panels shown in FIGS. 25, 26, and 27.

In the present embodiment, the two kinds of the detection electrodes 25 and 26 having different line widths are provided for the liquid crystal display panel 60, as one of the electrodes of the touch sensor of the electrostatic capacitance type used for detecting the contact/non-contact state. The detection electrodes 25 and 26 are disposed opposing to the scan electrode (common electrode) 113 via a predetermined gap. Thus, when voltage is applied between the scan electrode (common electrode) 113 and the detection electrodes 25 and 26, for example, lines of electric force as illustrated in FIG. 28 are generated between the scan electrode (common electrode) 113 and the detection electrodes 25 and 26. In the gap between the scan electrode (common electrode) 113 and the detection electrodes 25 and 26, the lines of electric force extend almost straight. By the electric fields generated in the gap, a parallel plate capacitance $C_1$ is formed. On the other hand, around the gap between the scan electrode 113 and the detection electrodes 25 and 26, the lines of electric force extend largely around the top face side of the detection electrodes 25 and 26, and extend to the observer side more than the image display face 2A with which a finger or the like comes in contact. By the round electric field, a fringe capacitance $C_2$ is formed.

Although the parallel plate capacitance $C_1$ and the fringe capacitance $C_2$ are formed for both of the detection electrodes 25 and 26, a region in which the parallel plate capacitance $C_1$ is formed in the detection electrode 25 having a narrower line width is smaller than that of the detection electrode 26 having a wider line width. That is, a value of the parallel plate capacitance $C_1$ in the detection electrode 25 is smaller than that in the detection electrode 26. On the other hand, a size of a region in which the fringe capacitance $C_2$ is formed largely does not have the relation with the line width, and is proportional to the length of the edge of the detection electrodes 25 and 26. For example, as shown in FIGS. 25, 26, and 27, in the case where the detection electrode 25 is provided with the projection parts 25B, the region in which the fringe capacitance $C_2$ is formed in the detection electrode 25 is wider than that of the detection electrode 26 by the amount of the length of the edge included in the projection part 25B. Therefore, a ratio of the fringe capacitance $C_2$ in the capacitance (total capacitance) obtained by adding the parallel plate capacitance $C_1$ and the fringe capacitance $C_2$ in the detection electrode 25 is higher than that in the detection electrode 26.

It is now assumed that a finger or the like is brought close to the detection electrodes 25 and 26 and interrupts the electric field forming the fringe capacitance $C_2$. Due to the interruption with the finger or the like, the fringe capacitance $C_2$ decreases and, in association therewith, the total capacitance also decreases. A fluctuation rate (decrease rate) of the total capacitance in the detection electrode 25 is higher than that of the detection electrode 26. Therefore, when the plurality of scan electrodes 113 are selected in desired unit, the signal level of the detection signal $V_{det}$ obtained from the detection electrode 25 fluctuates largely between the time when the finger or the like touches the image display face 2A and the time when the finger or the like does not touch the image display face 2A. On the other hand, the signal level of the detection signal $V_{det}$ obtained from the detection electrode 26 fluctuates only by a fluctuation amount smaller than the fluctuation amount in the detection electrode 25, between the time when the finger or the like touches the image display face 2A and the time when the finger or the like does not touch the image display face 2A.

As described above, in the present embodiment, the sensitivity to touch of a finger or the like in the detection electrode 25 is higher than that in the detection electrode 26. Further, the sensitivity to touch of a finger or the like of the detection electrode 25 is constant regardless of the scan electrode (common electrode) 113. Similarly, the sensitivity of the detection electrode 26 is almost constant regardless of the scan electrode (common electrode) 113. In other words, in the present embodiment, the detection electrodes 25 and 26 having different sensitivities to touch of a finger or the like are provided for the touch panel 60.

Also, in the present embodiment, the detection electrodes 25 and 26 are formed so that, for example, when the object such as a finger or pen touches the image display face 2A, the capacitance (capacitance C) formed between the detection electrode 25 and the object, and the capacitance (capacitance D) formed between the detection electrode 26 and the object, are almost equalized. In the present embodiment, for example, as shown in FIGS. 25, 26, and 27, in the case where the detection electrodes 25 and 26 are disposed alternately in the row direction, or disposed so that the projection parts 25B of the detection electrode 25 are closer to the neighboring detection electrode 26 more than the electrode parts of the detection electrode 25, the capacitance C and the capacitance D are almost equalized. In the present embodiment, for example, as shown in FIGS. 25, 26, and 27, also in the case where the area of the part facing one scan electrode 22 in the detection electrode 25 and the area of the part facing one scan electrode 22 in the detection electrode 26 are equalized, the capacitance C and the capacitance D are almost equalized.

Consequently, for example, sensitivity to external noise in the detection electrode 25 and that in the detection electrode 26 are almost equalized when the user becoming as an antenna and catching the external noise touches the panel with his/her finger and the external noise is transmitted to the liquid crystal display panel 60 via the finger. In the case where the sensitivity to the external noise of the detection electrode 25 and the sensitivity to the external noise of the detection electrode 26 are equal to each other, the signal level of the external noise included in the detection signal $V_{det}$ obtained from the detection electrode 25 and that of the external noise included in the detection signal $V_{det}$ obtained from the detection electrode 26 are equal to each other. Therefore, for example, by calculating the difference between the detection signal $V_{det}$ obtained from the detection electrode 25 and that obtained from the detection electrode 26, the external noise is eliminated from the detection signals.

From the above, by providing the two kinds of the detection electrodes 25 and 26 having the different sensitivities to the contact/non-contact state and having the almost equal sensitivities to the external noise, the external noise is eliminated from the detection signal $V_{det}$ only by calculating the difference of the detection signals $V_{det}$. Therefore, it is possible to eliminate the erroneous detection caused by the external noise.

Modifications of Fifth Embodiment

[Modification 1]

Although the case where one common electrode 113 is connected to one common connection line COM has been described in the fifth embodiment, the plurality of neighboring common electrodes 113 may be connected to one common connection line COM. In such a case, as compared with the case where one common electrode 113 is connected to one common connection line COM, the signal level of the detection signal $V_{det}$ obtained from the detection electrodes 25 and 26 is made higher.

[Modification 2]

Figure 29:
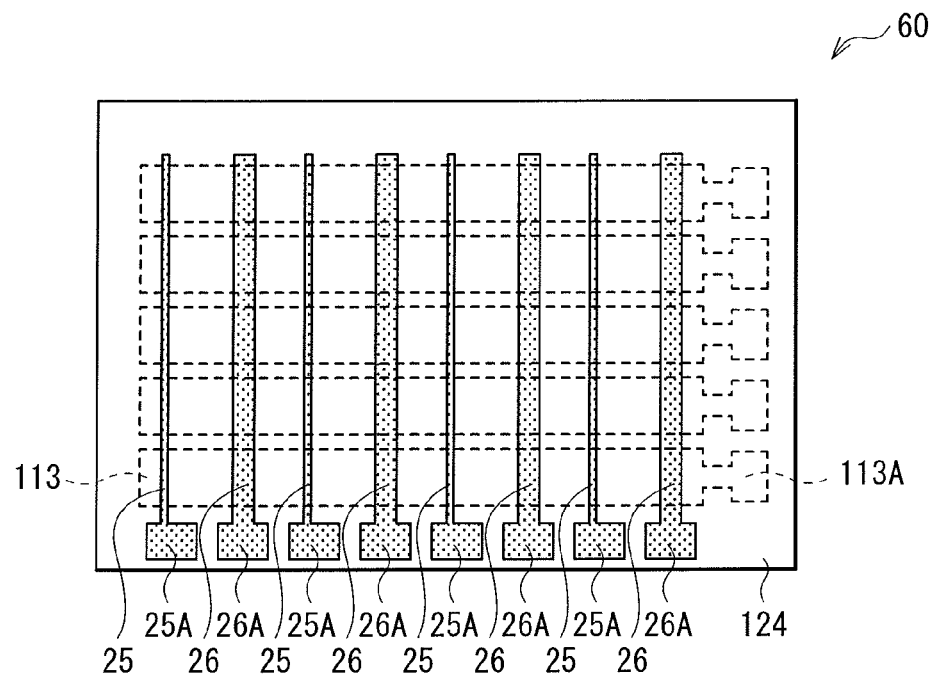
FIG. 29 is a diagram illustrating another example of the top face configuration of the liquid crystal display panel shown in FIG. 21.

In the fifth embodiment, the detection electrodes 25 and 26 are formed so that the capacitances C and D become almost equal to each other. However, for example, due to manufacture error or the like, there may be a case that the capacitances C and D are slightly different from each other. Also, for example, in the case where the projection parts 25B of the detection electrode 25 are eliminated and the detection electrode 25 is formed in a rod-like shape as illustrated in FIG. 29, the capacitances C and D are largely different from each other. On the assumption of those cases, as means for ensuring that the erroneous detection caused by the external noise is eliminated, for example, the output adjustment circuit 56 as shown in FIG. 16, may be further provided. With this configuration, the external noise is eliminated from the detection signal $V_{det}$ only by calculating the difference between two signals output from the output adjustment circuit 56. Therefore, it is possible to eliminate the erroneous detection caused by the external noise.

Sixth Embodiment

Figure 30:
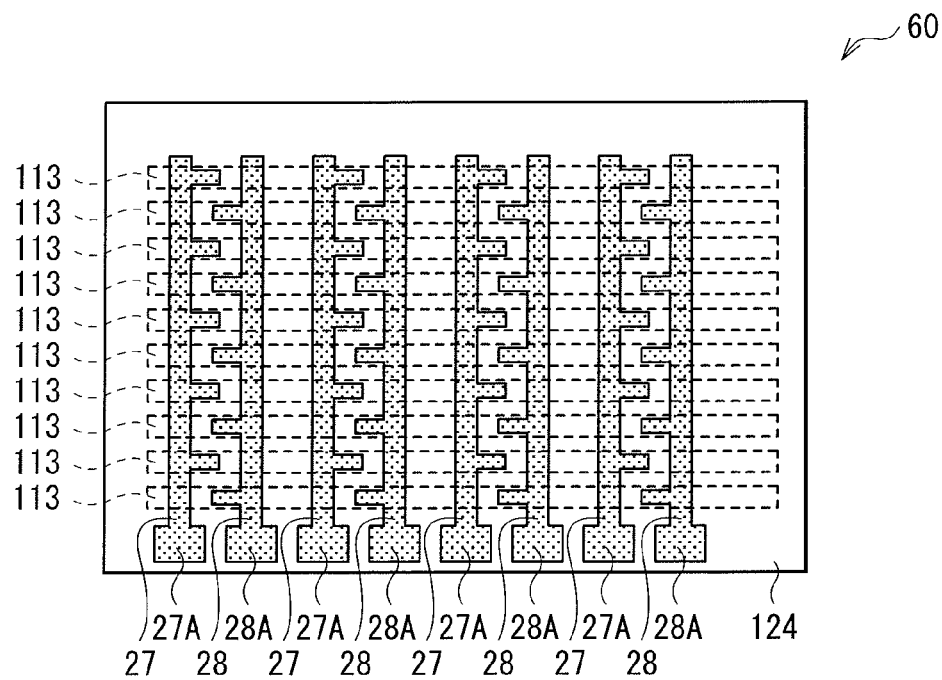
FIG. 30 is a diagram illustrating an example of the top face configuration of a touch panel mounted on a liquid crystal display device according to a sixth embodiment of the invention.

FIG. 30 illustrates an example of the top face configuration of the liquid crystal display panel 60 included in a liquid crystal display device according to a sixth embodiment of the invention. The liquid crystal display device according to the sixth embodiment is different from the configuration of the liquid crystal display device 2 according to the fifth embodiment, in that a plurality of detection electrodes 27 are provided in place of the plurality of detection electrodes 25, and a plurality of detection electrodes 28 are provided in place of the plurality of detection electrodes 26 in the liquid crystal display panel 60.

The detection electrodes 27 and 28 have configurations similar to those of the detection electrodes 27 and 28 in the second embodiment. That is, also in the sixth embodiment, the shapes of the detection electrodes 27 and 28 are different from each other. The sensitivity to touch of a finger or the like of the detection electrode 27 and that of the detection electrode 28 are different from each other depending on the scan electrode 22. On the other hand, the sensitivity to external noise of the detection electrode 27 and that of the detection electrode 28 are almost equal to each other. Consequently, the external noise is removed from the detection signals $V_{det}$ only by calculating the difference between the detection signals $V_{det}$. Therefore, it is possible to eliminate the erroneous detection caused by the external noise.

[Modifications of Sixth Embodiment]
[Modification 1]

Although the case where one common electrode 113 is connected to one common connection line COM has been described in the sixth embodiment, the plurality of neighboring common electrodes 113 may be connected to one common connection line COM. In such a case, as compared with the case where one common electrode 113 is connected to one common connection line COM, the signal level of the detection signal $V_{det}$ obtained from the detection electrodes 27 and 28 is made higher.

[Modification 2]

In the sixth embodiment, the detection electrodes 27 and 28 are formed so that the capacitances C and D become almost equal to each other. However, for example, due to manufacture error or the like, there may be a case that the capacitances C and D are slightly different from each other. On the assumption of such a case, as means for ensuring that the erroneous detection caused by the external noise is eliminated, for example, the output adjustment circuit 56 as shown in FIG. 16, may be further provided. With this configuration, the external noise is eliminated from the detection signal $V_{det}$ only by calculating the difference between two signals output from the output adjustment circuit 56. Therefore, it is possible to eliminate the erroneous detection caused by the external noise.

APPLICATION EXAMPLES

Hereinbelow, application examples of the display device with the touch sensor described in the foregoing embodiments and modifications will be described with reference to FIGS. 31 to 35G. The display devices according to the foregoing embodiments and the modifications are applicable to electronic devices in all of fields such as a television apparatus, a digital camera, a notebook-sized personal computer, a portable terminal device such as a cellular phone, and a video camera. In other words, the display devices according to the embodiments and the modifications are applicable to electronic devices in all of fields, which display a video signal input from the outside or a video signal generated internally as an image or a video image.

Application Example 1

Figure 31:
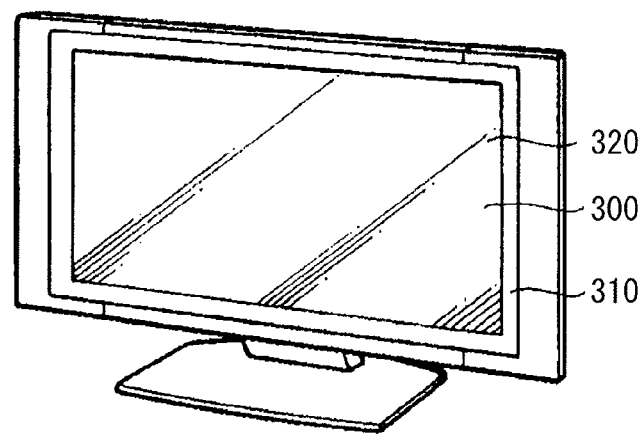

FIG. 31 illustrates the appearance of a television apparatus to which the display device according to any of the embodiments and the modifications is applied. The television apparatus has, for example, a video display screen 300 including a front panel 310 and a filter glass 320. The video display screen 300 is structured by the display device according to any of the embodiments and the modifications.

Application Example 2

Figure 32A:
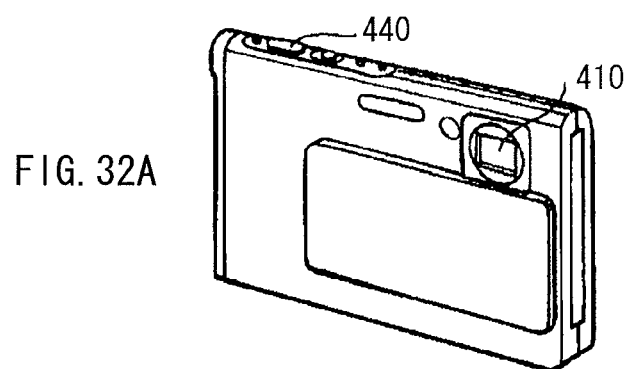
FIG. 32A is a perspective view of the appearance from the front side in application example 2.
Figure 32B:
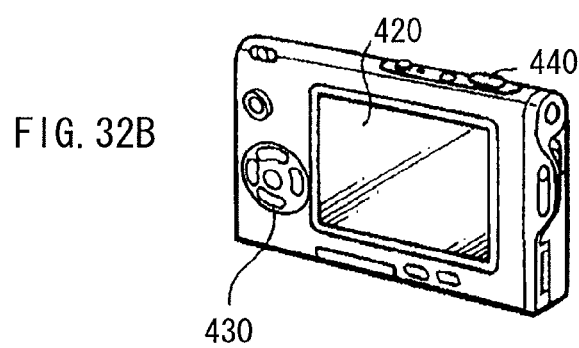
FIG. 32B is a perspective view of the appearance from the back side.

FIGS. 32A and 32B illustrate the appearance of a digital camera to which the display device according to any of the embodiments and the modifications is applied. The digital camera has, for example, a light emission unit 410 for flash, a display section 420, a menu switch 430, and a shutter-release button 440. The display section 420 is structured by the display device according to any of the foregoing embodiments and the modifications.

Application Example 3

Figure 33:
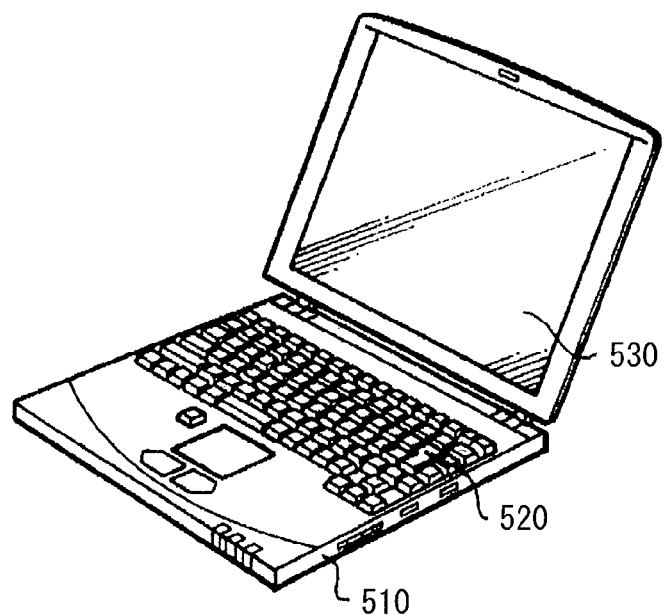
FIG. 33 is a perspective view illustrating the appearance of application example 3.

FIG. 33 illustrates the appearance of a notebook-sized personal computer to which the display device according to any of the foregoing embodiments and the modifications is applied. The notebook-sized personal computer has, for example, a body 510, a keyboard 520 for operation of entering characters and the like, and a display section 530 for displaying an image. The display section 530 is structured by the display device according to any of the foregoing embodiments and the modifications.

Application Example 4

Figure 34:
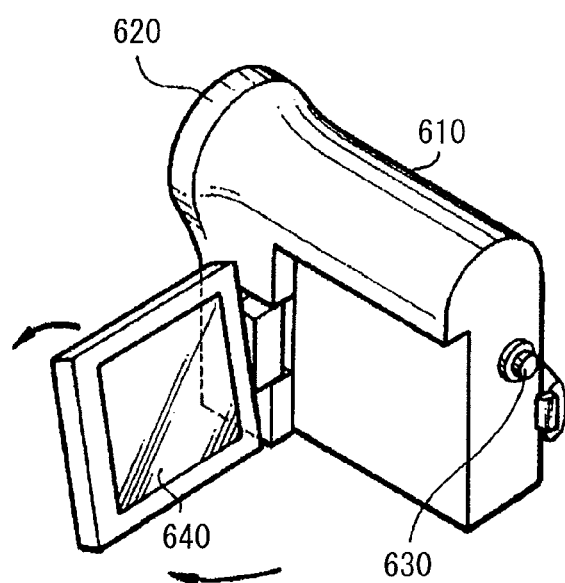
FIG. 34 is a perspective view illustrating the appearance of application example 4.

FIG. 34 illustrates the appearance of a video camera to which the display device according to any of the embodiments and the modifications is applied. The video camera has, for example, a body 610, a lens 620 provided on the front face of the body 610 for photographing an object, a photographing start-stop switch 630, and a display section 640. The display section 640 is structured by the display device according to any of the embodiments and the modifications.

Application Example 5

FIGS. 35A to 35G illustrate the appearance of a cellular phone to which the display device according to any of the embodiments and the modifications is applied. The cellular phone is obtained by, for example, coupling an upper-side casing 710 and a lower-side casing 720 via a coupling unit (hinge) 730, and has a display 740, a sub-display 750, a picture light 760, and a camera 770. The display 740 or the sub-display 750 is structured by the display device according to any of the embodiments and the modifications.

The present invention has been described above with reference to the embodiments and their modifications and application examples. However, the invention is not limited to the embodiments, the modifications, and the application examples, but may be variously modified.

For example, although the case of using the transmission-type element as the liquid crystal display element has been described in the foregoing embodiments, the modifications, and the application examples, an element other than the transmission type, for example, a reflection-type element, may be used. In this case, the light source (backlight 30) is eliminated, or the light source is disposed on the top face side of the liquid crystal display element.

Although the case of applying any of the foregoing embodiments, the modifications, and the application examples to the display device using the liquid crystal display element as the display element has been described, the foregoing embodiments, the modifications, and the application examples are also applicable to a display device using a display element other than the liquid crystal display element, such as an organic EL element.

The series of processes described in the foregoing embodiments, the modifications, and the application examples may be performed by hardware or software. In the case of performing the series of processes by software, a program configuring the software is installed in a general computer or the like. Such a program may be preliminarily recorded on a recording medium built in the computer.

The present application contains subject matter related to that disclosed in Japanese Priority Patent Application JP 2009-136507 filed in the Japan Patent Office on Jun. 5, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A touch sensor device comprising:
a substrate; and
a detection electrode on the substrate,
the detection electrode including an extending part, a first linear part extending in a first direction, first connecting parts directly connecting the first linear part with the extending part, a second linear part extending in the first direction, and second connecting parts directly connecting the second linear part with the extending part,
wherein both of the first and second linear parts are shorter than the extending part,
the first linear part and the second linear part are arranged in the first direction,
the first linear part and the extending part are arranged in a second direction different from the first direction,
the second linear part and the extending part are arranged in the second direction, and
the first linear part has a first end and
the second linear part has a second end facing the first end across a gap therebetween.

2. The touch sensor device according to claim 1, wherein the extending part extends in the first direction.

3. The touch sensor device according to claim 1, wherein a longitudinal direction of the first linear part, a longitudinal direction of the second linear part, and a longitudinal direction of the extending part are the first direction.

4. The touch sensor device according to claim 1, wherein a longitudinal direction of each of the first and the second connecting parts is the second direction.

5. The touch sensor device according to claim 1, wherein both of the first and the second connecting parts have a linear shape.

6. The touch sensor device according to claim 1, wherein:
the first connecting parts, part of the first linear part, and part of the extending part constitute a first annular shape, and
the first end of the first linear part protrudes from the first annular shape.

7. The touch sensor device according to claim 6, wherein:
the second connecting parts, part of the second linear part, and part of the extending part constitute a second annular shape, and
the second end of the second linear part protrudes from the second annular shape.

8. The touch sensor device according to claim 7, wherein:
the first end of the first linear part protrudes from the first annular shape toward the second end, and
the second end of the second linear part protrudes from the second annular shape toward the first end.

9. The touch sensor device according to claim 1, wherein a same voltage is applied to the first linear part, the second linear part, the extending part, the first connecting parts, and the second connecting parts.

10. The touch sensor device according to claim 1, wherein the gap does not include any conductive film.

11. The touch sensor device according to claim 1, wherein no conductive film is included in an area between the first end and the second end.

12. The touch sensor device according to claim 1, wherein the extending part is in contact with none of the first and the second linear parts.

13. A touch sensor device comprising:
a substrate; and
a detection electrode on the substrate,
the detection electrode including an extending part, a first linear part with a first end, a second linear part with a second end, the first linear part and second linear part extending in a first direction, first connecting parts directly connecting the first linear part with the extending part, and second connecting parts directly connecting the second linear part with the extending part, wherein
the first linear part and the second linear part are arranged in the first direction, separated from each other, and located at a same side of the extending part, and
a distance between the first end and the second end is smaller than a length of one of the first connecting part and the second connecting part.

14. The touch sensor device according to claim 13, wherein both of the first and the second linear parts are shorter than the extending part.

15. The touch sensor device according to claim 13, wherein a longitudinal direction of the first linear part, a longitudinal direction of the second linear part, and a longitudinal direction of the extending part are the first direction.

16. The touch sensor device according to claim 13, wherein no conductive film is included in an area between the first end and the second end.

17. The touch sensor device according to claim 13, wherein:
the first connecting parts, part of the first linear part, and part of the extending part constitute a first annular shape,
the second connecting parts, part of the second linear part, and part of the extending part constitute a second annular shape,
the first end of the first linear part protrudes from the first annular shape toward the second end, and
the second end of the second linear part protrudes from the second annular shape toward the first end.

18. A touch sensor device comprising:
a substrate; and
a detection electrode on the substrate, the detection electrode including
a base linear part,
a first annular shape, and
a second annular shape,
wherein the first annular shape includes
  the base linear part,
  a first linear part, and
  first connecting parts connecting the first linear part with the base linear part,
the second annular shape includes
  the base linear part,
  a second linear part, and
  second connecting parts connecting the second linear part with the base linear part,
the first linear part and the second linear part are located at a same side of the base linear part,
the first linear part has a first protrusion protruding from the first annular shape toward the second linear part,
the second linear part has a second protrusion protruding from the second annular shape toward the first linear part, and
a first end of the first protrusion is separated from a second end of the second protrusion, and
a distance between the first end and the second end is smaller than a distance of the first linear part and the base linear part.

19. The touch sensor device according to claim 18, wherein
  a longitudinal direction of the first linear part, a longitudinal direction of the second linear part, and a longitudinal direction of the base linear part are a same direction, and
  the first linear part and the second linear part are arranged in the same direction.

20. The touch sensor device according to claim 18, wherein
  the detection electrode includes a third annular shape including the base linear part, and
  the first annular shape, the second annular shape, and the third annular shape are arranged in a longitudinal direction of the base linear part.

* * * * *